US012686964B2

(12) United States Patent
Palanisamy et al.

(10) Patent No.: US 12,686,964 B2
(45) Date of Patent: Jul. 21, 2026

(54) FILTER UNIT FOR FILTERING MICROPARTICLES AND A FILTER CAGE FOR USE IN A FILTER UNIT

(71) Applicant: Xeros Limited, Rotherham (GB)

(72) Inventors: Sekar Palanisamy, Bangalore (IN); Jack Edward Quarmby, Bangalore (IN); Sundar Mani, Bangalore (IN); Akhil George Aruparayil Thomson, Bangalore (IN); Joseph Michael Mattley, Rotherham (GB); Thomas Andrew Cobb, Rotherham (GB); James Richard Pease, Rotherham (GB)

(73) Assignee: XEROS LIMITED, Sheffield (GB)

( * ) Notice: Subject to any disclaimer, the term of this patent is extended or adjusted under 35 U.S.C. 154(b) by 368 days.

(21) Appl. No.: 18/288,522

(22) PCT Filed: Apr. 28, 2022

(86) PCT No.: PCT/GB2022/051085
§ 371 (c)(1),
(2) Date: Oct. 26, 2023

(87) PCT Pub. No.: WO2022/229646
PCT Pub. Date: Nov. 3, 2022

(65) Prior Publication Data
US 2024/0209560 A1      Jun. 27, 2024

(30) Foreign Application Priority Data
Apr. 28, 2021    (GB) ...................................... 2106081

(51) Int. Cl.
D06F 39/10          (2006.01)
B01D 33/11          (2006.01)

(52) U.S. Cl.
CPC .............. *D06F 39/10* (2013.01); *B01D 33/11* (2013.01); *B01D 2201/305* (2013.01); *B01D 2201/306* (2013.01)

(58) Field of Classification Search
CPC ......... D06F 39/10; D06F 58/22; B01D 33/11; B01D 2201/305; B01D 2201/301; B01D 2201/306; B04B 3/00; B04B 11/08
(Continued)

(56) References Cited

U.S. PATENT DOCUMENTS 636,016 A     10/1899  Welch
866,424 A      9/1907  Blaisdell
(Continued)

FOREIGN PATENT DOCUMENTS

CA          2526819 A1      5/2007
CN          2493870 Y       5/2002
(Continued)

OTHER PUBLICATIONS

Ji et al, English machine translation CN 107485909 A, pp. 1-9 (Year: 2017).*
(Continued)

*Primary Examiner* — Claire A Norris
(74) *Attorney, Agent, or Firm* — Clark & Elbing LLP

(57)          ABSTRACT

A filter unit and a filter cage, the filter unit comprising a filter chamber and a filter cage. The filter chamber comprises opposing first and second end walls, a sidewall therebetween, and an opening in the second end wall. The filter cage is rotatable in the filter unit and comprises a sidewall comprising filter media and an opening at a first end for the filter cage. The filter cage is removable via the opening in the filter chamber. The filter chamber further comprises an inlet to pass feed liquid into the filter cage via the opening and an outlet for filtered liquid. The filter unit further comprises a
(Continued)

drive shaft to rotate the filter cage. A connection member in the filter chamber forms a rotary seal and a detachable connection to the filter cage. This arrangement permits removal and emptying of the filter cage a single operation amongst other benefits. In alternative aspects a filter cage comprises a moveable member and a user operable portion for extraction of filtered microparticles through the opening.

13 Claims, 12 Drawing Sheets

(58) Field of Classification Search
USPC .............................................. 210/391, 380.2
See application file for complete search history.

(56) References Cited

U.S. PATENT DOCUMENTS

| | | | |
|---|---|---|---|
| 983,735 A | 2/1911 | Lutz et al. |
| 1,262,146 A | 4/1918 | Ward |
| 1,292,758 A | 1/1919 | Gonzalez |
| 1,510,863 A | 10/1924 | Rose |
| 1,603,125 A | 10/1926 | Lewis |
| 1,761,593 A | 6/1930 | Sharples |
| 1,767,314 A | 6/1930 | Schmitz |
| 2,190,072 A | 2/1940 | Keys |
| 2,436,218 A | 2/1948 | Malcolm |
| 2,516,963 A | 8/1950 | Frank et al. |
| 2,527,695 A | 10/1950 | Bennett |
| 2,548,417 A | 4/1951 | Baxter, Jr. |
| 2,695,133 A | 11/1954 | Drury |
| 2,976,998 A | 3/1961 | Smith |
| 2,991,887 A | 7/1961 | Walter et al. |
| 3,049,241 A | 8/1962 | Ruegg |
| 3,279,611 A | 10/1966 | Julius |
| 3,327,401 A | 6/1967 | Chris et al. |
| 3,365,066 A | 1/1968 | Howell |
| 3,401,800 A | 9/1968 | Stock |
| 3,438,500 A | 4/1969 | Pico |
| 3,504,794 A | 4/1970 | Tholl et al. |
| 3,623,613 A | 11/1971 | Quetsch |
| 3,630,379 A | 12/1971 | Sharples |
| 3,682,373 A | 8/1972 | Mercier |
| 3,708,111 A | 1/1973 | Sheeler et al. |
| 3,750,885 A | 8/1973 | Fournier |
| 3,762,563 A | 10/1973 | Petersen |
| 3,827,985 A | 8/1974 | Cohen et al. |
| 3,845,740 A | 11/1974 | Ferrara |
| 3,864,256 A | 2/1975 | Hultsch et al. |
| 3,943,056 A | 3/1976 | Hultsch et al. |
| 3,954,606 A | 5/1976 | Block et al. |
| 3,959,140 A | 5/1976 | Legras |
| 3,989,185 A | 11/1976 | Mercier |
| 4,000,074 A | 12/1976 | Evans |
| 4,052,303 A | 10/1977 | Hultsch et al. |
| 4,052,304 A | 10/1977 | Vertenstein |
| 4,063,959 A | 12/1977 | Dietzel et al. |
| 4,101,421 A | 7/1978 | Hultsch |
| 4,193,874 A | 3/1980 | Gerteis |
| 4,200,530 A | 4/1980 | Mechalas |
| 4,223,829 A | 9/1980 | Bange |
| 4,269,711 A | 5/1981 | Gerteis |
| 4,298,476 A | 11/1981 | Dudley |
| 4,331,482 A | 5/1982 | Schaper |
| 4,339,072 A | 7/1982 | Hiller |
| 4,352,451 A | 10/1982 | Journet |
| 4,360,431 A | 11/1982 | Little |
| 4,362,620 A | 12/1982 | High |
| 4,443,343 A | 4/1984 | Merz |
| 4,455,844 A | 6/1984 | McMillan et al. |
| 4,518,621 A | 5/1985 | Alexander |
| 4,608,040 A | 8/1986 | Knelson |
| RE32,381 E | 3/1987 | Dudrey |
| 4,776,833 A | 10/1988 | Knelson |
| 4,842,722 A | 6/1989 | Holz |

| | | | |
|---|---|---|---|
| 4,848,105 A | 7/1989 | O'Connell et al. |
| 4,895,666 A | 1/1990 | Franzen et al. |
| 4,944,874 A | 7/1990 | Kobayashi et al. |
| 4,981,219 A | 1/1991 | Burnell et al. |
| 4,988,623 A | 1/1991 | Schwarz et al. |
| 4,997,575 A | 3/1991 | Hultsch |
| 5,004,540 A | 4/1991 | Hendricks |
| 5,024,647 A | 6/1991 | Jubin et al. |
| 5,030,361 A | 7/1991 | Ishida et al. |
| 5,031,522 A | 7/1991 | Brixel et al. |
| 5,032,258 A | 7/1991 | Hultsch |
| 5,092,995 A | 3/1992 | Gerteis |
| 5,127,587 A | 7/1992 | Johnson |
| 5,163,895 A | 11/1992 | Titus |
| 5,169,525 A | 12/1992 | Gerteis |
| 5,222,933 A | 6/1993 | Knelson et al. |
| 5,223,137 A | 6/1993 | Hattori et al. |
| 5,227,066 A | 7/1993 | Ishida et al. |
| 5,244,502 A | 9/1993 | Schaper et al. |
| 5,246,600 A | 9/1993 | Reichner |
| 5,250,180 A | 10/1993 | Chang |
| 5,264,124 A | 11/1993 | Nemedi |
| 5,275,727 A | 1/1994 | Nemedi |
| 5,304,306 A | 4/1994 | Gerteis |
| 5,306,423 A | 4/1994 | Hultsch |
| 5,338,285 A | 8/1994 | Omori |
| 5,344,493 A | 9/1994 | Jackson |
| 5,368,171 A | 11/1994 | Jackson |
| 5,368,541 A | 11/1994 | Knelson |
| 5,370,796 A | 12/1994 | Grimwood |
| 5,372,571 A | 12/1994 | Knelson et al. |
| 5,421,997 A | 6/1995 | Gerteis |
| 5,458,776 A | 10/1995 | Preisser et al. |
| 5,460,717 A | 10/1995 | Grimwood et al. |
| 5,468,389 A | 11/1995 | Keller |
| 5,472,602 A | 12/1995 | Feller et al. |
| 5,485,066 A | 1/1996 | Zeigler |
| 5,490,453 A | 2/1996 | Mackay |
| 5,505,863 A | 4/1996 | Danon et al. |
| 5,538,630 A | 7/1996 | Burns |
| 5,547,573 A | 8/1996 | Martin |
| 5,582,726 A | 12/1996 | Feller et al. |
| 5,586,965 A | 12/1996 | Knelson |
| 5,601,523 A | 2/1997 | Knelson |
| 5,630,938 A | 5/1997 | Feller et al. |
| 5,635,065 A | 6/1997 | Spyra |
| 5,665,925 A | 9/1997 | Gerteis |
| 5,713,826 A | 2/1998 | West |
| 5,759,411 A | 6/1998 | Gold |
| 5,770,058 A | 6/1998 | Jozwiak |
| 5,771,601 A | 6/1998 | Veal et al. |
| 5,784,902 A | 7/1998 | Pinkowski et al. |
| 5,837,138 A | 11/1998 | Boele |
| 5,865,993 A | 2/1999 | Wienicke |
| 5,891,347 A | 4/1999 | Matsumoto |
| 5,956,858 A | 9/1999 | Veal et al. |
| 5,988,398 A | 11/1999 | Gerteis |
| 6,033,563 A | 3/2000 | Gerteis |
| 6,068,707 A | 5/2000 | Magliocca |
| 6,159,360 A | 12/2000 | Gerteis et al. |
| 6,210,311 B1 | 4/2001 | May |
| 6,314,824 B1 | 11/2001 | Gerteis |
| 6,408,703 B2 | 6/2002 | Gerteis |
| 6,424,067 B1 | 7/2002 | Samways |
| 6,440,316 B1 | 8/2002 | Yoon et al. |
| 6,495,038 B1 | 12/2002 | Kondoh et al. |
| 6,622,618 B1 | 9/2003 | Glucksman et al. |
| 6,755,969 B2 | 6/2004 | Kirker et al. |
| 6,820,446 B2 | 11/2004 | Arai et al. |
| 6,869,389 B2 | 3/2005 | Mackel et al. |
| 6,890,443 B2 | 5/2005 | Adams |
| 6,974,546 B2 | 12/2005 | Wood |
| 6,997,859 B2 | 2/2006 | Peacocke et al. |
| 7,105,090 B2 | 9/2006 | Choo |
| 7,144,360 B2 | 12/2006 | Zonneveld et al. |
| 7,168,571 B2 | 1/2007 | Gerteis et al. |
| 7,234,512 B2 | 6/2007 | Anderson |
| 7,311,816 B2 | 12/2007 | Kessler et al. |
| 7,401,479 B2 | 7/2008 | Fields |

(56)                   References Cited

U.S. PATENT DOCUMENTS

| | | | |
|---|---|---|---|
| 7,445,123 | B1 | 11/2008 | Chiou |
| 7,503,888 | B1 | 3/2009 | Peacocke et al. |
| 7,686,965 | B2 | 3/2010 | Cook |
| 7,846,259 | B2 | 12/2010 | Magliocca |
| 7,908,764 | B1 | 3/2011 | Estes et al. |
| 8,042,281 | B1 | 10/2011 | Estes et al. |
| 8,065,954 | B2 | 11/2011 | Foster et al. |
| 8,485,367 | B2 | 7/2013 | Mathew et al. |
| 8,549,993 | B2 | 10/2013 | Foster et al. |
| 8,647,516 | B2 | 2/2014 | Love |
| 8,746,261 | B2 | 6/2014 | Welch |
| 8,808,155 | B2 | 8/2014 | Zonneveld et al. |
| 8,815,292 | B2 | 8/2014 | Watson et al. |
| 8,959,961 | B2 | 2/2015 | Jenkins et al. |
| 8,974,545 | B2 | 3/2015 | Burkinshaw et al. |
| 8,980,325 | B2 | 3/2015 | Watson et al. |
| 9,004,743 | B2 | 4/2015 | Wood et al. |
| 9,011,922 | B2 | 4/2015 | Watson et al. |
| 9,017,423 | B2 | 4/2015 | Burkinshaw et al. |
| 9,034,195 | B2 | 5/2015 | Wood |
| 9,107,559 | B2 | 8/2015 | Tuller et al. |
| 9,121,000 | B2 | 9/2015 | Burkinshaw et al. |
| 9,126,233 | B2 | 9/2015 | Sierens et al. |
| 9,127,882 | B2 | 9/2015 | Jenkins et al. |
| 9,155,895 | B2 | 10/2015 | Wacnik et al. |
| 9,198,929 | B2 | 12/2015 | Watson et al. |
| 9,237,836 | B2 | 1/2016 | Blanchard et al. |
| 9,248,455 | B2 | 2/2016 | Teduka et al. |
| 9,272,000 | B2 | 3/2016 | Watson et al. |
| 9,297,107 | B2 | 3/2016 | Jenkins |
| 9,315,766 | B2 | 4/2016 | He et al. |
| 9,393,505 | B2 | 7/2016 | Rusconi Clerici et al. |
| 9,402,803 | B2 | 8/2016 | Archambeau et al. |
| 9,404,210 | B2 | 8/2016 | He et al. |
| 9,410,278 | B2 | 8/2016 | He et al. |
| 9,476,155 | B2 | 10/2016 | He et al. |
| 9,487,898 | B2 | 11/2016 | He et al. |
| 9,511,333 | B2 | 12/2016 | Wood et al. |
| 9,512,398 | B2 | 12/2016 | Wood et al. |
| 9,523,090 | B2 | 12/2016 | Watson et al. |
| 9,523,169 | B2 | 12/2016 | Sawford et al. |
| 9,550,966 | B2 | 1/2017 | Burkinshaw et al. |
| 9,555,352 | B2 | 1/2017 | Stiles, Jr. et al. |
| 9,569,974 | B2 | 2/2017 | Albert et al. |
| 9,587,337 | B2 | 3/2017 | He et al. |
| 9,587,340 | B2 | 3/2017 | Jenkins et al. |
| 9,631,314 | B2 | 4/2017 | Yin et al. |
| 9,649,006 | B2 | 5/2017 | Dries |
| 9,693,670 | B2 | 7/2017 | Dries |
| 9,745,567 | B2 | 8/2017 | Watson et al. |
| 9,751,094 | B2 | 9/2017 | Gardiner et al. |
| 9,803,307 | B2 | 10/2017 | Jenkins et al. |
| 9,834,881 | B2 | 12/2017 | Sawford et al. |
| 9,845,516 | B2 | 12/2017 | Steele |
| 9,850,455 | B2 | 12/2017 | Jenkins et al. |
| 9,850,619 | B2 | 12/2017 | Wells et al. |
| 9,914,901 | B2 | 3/2018 | Burkinshaw et al. |
| 9,932,700 | B2 | 4/2018 | Wells et al. |
| 10,017,895 | B2 | 7/2018 | Wells et al. |
| 10,052,640 | B2 | 8/2018 | Vicentini et al. |
| 10,081,900 | B2 | 9/2018 | Wells et al. |
| 10,125,359 | B2 | 11/2018 | Watson et al. |
| 10,287,642 | B2 | 5/2019 | Scott |
| 10,301,691 | B2 | 5/2019 | Feyisa et al. |
| 10,316,448 | B2 | 6/2019 | He et al. |
| 10,464,590 | B2 | 11/2019 | Stinebring et al. |
| 10,494,590 | B2 | 12/2019 | Abercrombie et al. |
| 10,513,746 | B2 | 12/2019 | Myers et al. |
| 10,590,499 | B2 | 3/2020 | Ashfaq et al. |
| 10,597,814 | B2 | 3/2020 | Wells et al. |
| 10,639,647 | B2 | 5/2020 | Meier |
| 10,648,120 | B2 | 5/2020 | Gonzaga et al. |
| 10,695,774 | B2 | 6/2020 | Corbus |
| 10,733,976 | B2 | 8/2020 | Coifman |
| 10,745,769 | B2 | 8/2020 | Steele |
| 10,773,976 | B2 | 9/2020 | Scott et al. |
| 10,781,404 | B2 | 9/2020 | Bird et al. |
| 10,808,289 | B2 | 10/2020 | Sadeghi |
| 10,927,622 | B2 | 2/2021 | Newman et al. |
| 11,007,539 | B2 | 5/2021 | Weingartner et al. |
| 11,299,839 | B2 | 4/2022 | Jones et al. |
| 11,414,633 | B2 | 8/2022 | Bird et al. |
| 11,414,806 | B2 | 8/2022 | Gonzaga et al. |
| 2002/0017148 | A1 | 2/2002 | Gerteis |
| 2002/0030024 | A1 | 3/2002 | Leung et al. |
| 2004/0104158 | A1 | 6/2004 | Kim et al. |
| 2004/0121892 | A1 | 6/2004 | Zonneveld et al. |
| 2005/0000869 | A1 | 1/2005 | Kessler et al. |
| 2005/0161391 | A1 | 7/2005 | Ettlinger |
| 2006/0175245 | A1 | 8/2006 | Gerteis et al. |
| 2007/0051245 | A1 | 3/2007 | Yun |
| 2007/0215560 | A1 | 9/2007 | Whisler et al. |
| 2008/0190870 | A1 | 8/2008 | Schoeb |
| 2009/0044706 | A1 | 2/2009 | Foster et al. |
| 2009/0045147 | A1 | 2/2009 | Schmid |
| 2009/0071912 | A1 | 3/2009 | Mishina et al. |
| 2009/0098259 | A1 | 4/2009 | McEllen |
| 2009/0118111 | A1 | 5/2009 | Baumann et al. |
| 2009/0236296 | A1 | 9/2009 | Schmid |
| 2009/0321333 | A1 | 12/2009 | Magliocca |
| 2010/0130340 | A1 | 5/2010 | Denk |
| 2010/0187190 | A1 | 7/2010 | Kehl |
| 2010/0258109 | A1 | 10/2010 | Foster et al. |
| 2011/0011795 | A1 | 1/2011 | Hoff |
| 2011/0061545 | A1 | 3/2011 | Foster et al. |
| 2011/0079044 | A1 | 4/2011 | Teduka et al. |
| 2011/0290719 | A1 | 12/2011 | Mathew et al. |
| 2011/0296628 | A1 | 12/2011 | Jenkins et al. |
| 2011/0315621 | A1 | 12/2011 | Heley et al. |
| 2012/0012011 | A1 | 1/2012 | Millikin et al. |
| 2012/0048299 | A1 | 3/2012 | Jenkins et al. |
| 2012/0055345 | A1 | 3/2012 | Foster et al. |
| 2012/0055887 | A1 | 3/2012 | Love |
| 2012/0118336 | A1 | 5/2012 | Welch |
| 2012/0285868 | A1 | 11/2012 | Sierens et al. |
| 2013/0005559 | A1 | 1/2013 | Burford et al. |
| 2013/0133250 | A1 | 5/2013 | Chan |
| 2013/0140248 | A1 | 6/2013 | Yanda |
| 2013/0167882 | A1 | 7/2013 | Burkinshaw et al. |
| 2014/0021134 | A1 | 1/2014 | Lechuga Andrade et al. |
| 2014/0124431 | A1 | 5/2014 | Love |
| 2014/0197116 | A1 | 7/2014 | Yanda |
| 2014/0201929 | A1 | 7/2014 | He et al. |
| 2014/0238446 | A1 | 8/2014 | Welch |
| 2014/0317860 | A1 | 10/2014 | He et al. |
| 2014/0346126 | A1 | 11/2014 | Teduka et al. |
| 2015/0027173 | A1 | 1/2015 | Wu et al. |
| 2015/0096128 | A1 | 4/2015 | Sawford et al. |
| 2015/0136683 | A1 | 5/2015 | Rusconi Clerici et al. |
| 2015/0175945 | A1 | 6/2015 | Waddon et al. |
| 2015/0238977 | A1 | 8/2015 | Meier |
| 2015/0252511 | A1 | 9/2015 | Roberts et al. |
| 2015/0299615 | A1 | 10/2015 | Lee |
| 2015/0343334 | A1 | 12/2015 | Jons et al. |
| 2015/0367256 | A1 | 12/2015 | Takahashi |
| 2016/0019826 | A1 | 1/2016 | Kim et al. |
| 2016/0115065 | A1 | 4/2016 | Yamashita et al. |
| 2016/0115066 | A1 | 4/2016 | Yamashita et al. |
| 2016/0195409 | A1 | 7/2016 | Goldberg et al. |
| 2016/0197998 | A1 | 7/2016 | Carleo |
| 2016/0198926 | A1 | 7/2016 | Dries |
| 2016/0206173 | A1 | 7/2016 | Durham et al. |
| 2016/0236207 | A1 | 8/2016 | Vicentini et al. |
| 2016/0250603 | A1 | 9/2016 | Takahashi et al. |
| 2016/0251602 | A1 | 9/2016 | Steele et al. |
| 2016/0251603 | A1 | 9/2016 | Steele et al. |
| 2016/0310970 | A1 | 10/2016 | Gardiner et al. |
| 2017/0051447 | A1 | 2/2017 | He et al. |
| 2017/0073878 | A1 | 3/2017 | Xu et al. |
| 2017/0079502 | A1 | 3/2017 | Dries |
| 2017/0144092 | A1 | 5/2017 | Seeley |
| 2017/0159222 | A1 | 6/2017 | Jenkins et al. |
| 2017/0233938 | A1 | 8/2017 | Hwang et al. |
| 2017/0240982 | A1 | 8/2017 | Sadeghi |

(56) References Cited

U.S. PATENT DOCUMENTS

| | | | |
|---|---|---|---|
| 2017/0241061 A1 | 8/2017 | Wells et al. | |
| 2017/0247771 A1 | 8/2017 | Scott | |
| 2018/0057777 A1 | 3/2018 | Waddon et al. | |
| 2018/0134994 A1 | 5/2018 | Steele et al. | |
| 2018/0141089 A1 | 5/2018 | Sawford et al. | |
| 2018/0216049 A1 | 8/2018 | Bird et al. | |
| 2018/0313023 A1 | 11/2018 | Piekarski et al. | |
| 2019/0017215 A1 | 1/2019 | Gonzaga et al. | |
| 2019/0211288 A1 | 7/2019 | Potts et al. | |
| 2019/0233760 A1 | 8/2019 | Lavery et al. | |
| 2019/0247864 A1 | 8/2019 | Wu | |
| 2020/0002650 A1 | 1/2020 | Servin et al. | |
| 2020/0179950 A1 | 6/2020 | Weingartner et al. | |
| 2020/0179991 A1 | 6/2020 | Borghi et al. | |
| 2020/0199804 A1 | 6/2020 | Magnusson | |
| 2020/0240069 A1 | 7/2020 | Gonzaga et al. | |
| 2020/0254463 A1 | 8/2020 | Goertz et al. | |
| 2020/0299790 A1 | 9/2020 | Mahrholz et al. | |
| 2020/0316501 A1 | 10/2020 | Jones | |
| 2020/0378054 A1 | 12/2020 | Cobb et al. | |
| 2021/0069730 A1 | 3/2021 | Stephens et al. | |
| 2021/0162325 A1 | 6/2021 | Krampe | |
| 2021/0179979 A1 | 6/2021 | Servin et al. | |
| 2021/0220843 A1 | 7/2021 | Stephens et al. | |
| 2021/0229112 A1 | 7/2021 | Stephens et al. | |
| 2021/0269961 A1 | 9/2021 | Jones et al. | |
| 2021/0292957 A1 | 9/2021 | Jones et al. | |
| 2021/0316235 A1 | 10/2021 | Lee et al. | |
| 2021/0402418 A1 | 12/2021 | Zheng et al. | |
| 2022/0001397 A1 | 1/2022 | Dunsmuir et al. | |
| 2022/0016646 A1 | 1/2022 | Lee et al. | |
| 2022/0259790 A1 | 8/2022 | Jones et al. | |
| 2022/0298712 A1 | 9/2022 | Mattley et al. | |
| 2022/0356628 A1 | 11/2022 | Jones et al. | |
| 2023/0381693 A1 | 11/2023 | Wallace et al. | |
| 2023/0398474 A1 | 12/2023 | Mattley et al. | |
| 2025/0135379 A1 | 5/2025 | Peace | |

FOREIGN PATENT DOCUMENTS

| | | | | |
|---|---|---|---|---|
| CN | 200971442 Y | 11/2007 | | |
| CN | 201026461 Y | 2/2008 | | |
| CN | 201031312 Y | 3/2008 | | |
| CN | 101545194 A | 9/2009 | | |
| CN | 101566174 A | 10/2009 | | |
| CN | 201407724 Y | 2/2010 | | |
| CN | 201473788 U | 5/2010 | | |
| CN | 101988257 A | 3/2011 | | |
| CN | 102061589 A | 5/2011 | | |
| CN | 202014631 U | 10/2011 | | |
| CN | 202014633 U | 10/2011 | | |
| CN | 202175862 U | 3/2012 | | |
| CN | 102425053 A | 4/2012 | | |
| CN | 102425055 A | 4/2012 | | |
| CN | 202214631 U | 5/2012 | | |
| CN | 202214633 U | 5/2012 | | |
| CN | 202298219 U | 7/2012 | | |
| CN | 202298220 U | 7/2012 | | |
| CN | 202298222 U | 7/2012 | | |
| CN | 202323458 U | 7/2012 | | |
| CN | 202359387 U | 8/2012 | | |
| CN | 202359388 U | 8/2012 | | |
| CN | 202359389 U | 8/2012 | | |
| CN | 202359390 U | 8/2012 | | |
| CN | 202359396 U | 8/2012 | | |
| CN | 302020695 S | 8/2012 | | |
| CN | 202492706 U | 10/2012 | | |
| CN | 202543634 U | 11/2012 | | |
| CN | 202543635 U | 11/2012 | | |
| CN | 202543646 U | 11/2012 | | |
| CN | 202543652 U | 11/2012 | | |
| CN | 102899848 A | 1/2013 | | |
| CN | 202644211 U | 1/2013 | | |
| CN | 202688698 U | 1/2013 | | |
| CN | 202755211 U | 2/2013 | | |
| CN | 202755220 U | 2/2013 | | |
| CN | 202755221 U | 2/2013 | | |
| CN | 102953249 A | 3/2013 | | |
| CN | 102953250 A | 3/2013 | | |
| CN | 102953262 A | 3/2013 | | |
| CN | 102978870 A | 3/2013 | | |
| CN | 103061084 A | 4/2013 | | |
| CN | 103061085 A | 4/2013 | | |
| CN | 103061086 A | 4/2013 | | |
| CN | 103061087 A | 4/2013 | | |
| CN | 103087839 A | 5/2013 | | |
| CN | 103103720 A | 5/2013 | | |
| CN | 103103721 A | 5/2013 | | |
| CN | 103122566 A | 5/2013 | | |
| CN | 103122567 A | 5/2013 | | |
| CN | 202913242 U | 5/2013 | | |
| CN | 103225192 A | 7/2013 | | |
| CN | 203049283 U | 7/2013 | | |
| CN | 203123683 U | 8/2013 | | |
| CN | 103290653 A | 9/2013 | | |
| CN | 103361934 A | 10/2013 | | |
| CN | 103361938 A | 10/2013 | | |
| CN | 203370359 U | 1/2014 | | |
| CN | 102061588 B | 2/2014 | | |
| CN | 103556439 A | 2/2014 | | |
| CN | 103638750 A | 3/2014 | | |
| CN | 203530695 U | 4/2014 | | |
| CN | 203530700 U | 4/2014 | | |
| CN | 203530714 U | 4/2014 | | |
| CN | 203530718 U | 4/2014 | | |
| CN | 203530723 U | 4/2014 | | |
| CN | 203530725 U | 4/2014 | | |
| CN | 203852919 U | 10/2014 | | |
| CN | 204097757 U | 1/2015 | | |
| CN | 103285643 B | 4/2015 | | |
| CN | 204293963 U | 4/2015 | | |
| CN | 204428977 U | 7/2015 | | |
| CN | 204455619 U | 7/2015 | | |
| CN | 103451894 B | 11/2015 | | |
| CN | 103556434 B | 11/2015 | | |
| CN | 103556436 B | 11/2015 | | |
| CN | 103556431 B | 1/2016 | | |
| CN | 105333505 A | 2/2016 | | |
| CN | 103556432 B | 3/2016 | | |
| CN | 105420992 A | 3/2016 | | |
| CN | 105420993 A | 3/2016 | | |
| CN | 105421000 A | 3/2016 | | |
| CN | 105442267 A | 3/2016 | | |
| CN | 205088465 U | 3/2016 | | |
| CN | 205329373 U | 6/2016 | | |
| CN | 205329374 U | 6/2016 | | |
| CN | 205329380 U | 6/2016 | | |
| CN | 205329384 U | 6/2016 | | |
| CN | 105797519 A | 7/2016 | | |
| CN | 205504658 U | 8/2016 | | |
| CN | 205559299 U | 9/2016 | | |
| CN | 205886468 U | 1/2017 | | |
| CN | 205917483 U | 2/2017 | | |
| CN | 106702688 A | 5/2017 | | |
| CN | 106948137 A | 7/2017 | | |
| CN | 107083653 A | 8/2017 | | |
| CN | 107485909 A | * 12/2017 | ............ B01D 33/50 | |
| CN | 107574630 A | 1/2018 | | |
| CN | 108330630 A | 7/2018 | | |
| CN | 207614500 U | 7/2018 | | |
| CN | 108455777 A | 8/2018 | | |
| CN | 107281813 B | 8/2019 | | |
| DE | 10230488 A1 | 1/2004 | | |
| EP | 0289674 A1 | 11/1988 | | |
| EP | 1101518 A2 | 5/2001 | | |
| EP | 1201812 B1 | 8/2005 | | |
| EP | 0980669 B1 | 6/2008 | | |
| EP | 2778272 A1 | 9/2014 | | |
| EP | 2949627 A1 | 12/2015 | | |
| EP | 2445533 B1 | 2/2017 | | |
| EP | 3124674 A1 | 2/2017 | | |
| EP | 3385440 A1 | 10/2018 | | |
| EP | 3727639 B1 | 6/2023 | | |
| FR | 2250710 A1 | 6/1975 | | |

(56) References Cited

FOREIGN PATENT DOCUMENTS

| | | | |
|----|----------------|----|---------|
| GB | 2576859 | A | 3/2020 |
| GB | 2581790 | A | 9/2020 |
| GB | 2582042 | A | 9/2020 |
| GB | 2600921 | A | 5/2022 |
| JP | S4829064 | A | 4/1973 |
| JP | S59-102414 | A | 6/1984 |
| JP | S6072598 | A | 4/1985 |
| JP | S60145191 | A | 7/1985 |
| JP | 2005531433 | A | 10/2005 |
| JP | 2007130380 | A | 5/2007 |
| JP | 2011115554 | A | 6/2011 |
| JP | 2013-22555 | A | 2/2013 |
| JP | 2013-71043 | A | 4/2013 |
| JP | 2014018767 | A | 2/2014 |
| JP | 2017-512517 | A | 5/2017 |
| JP | 2018175680 | A | 11/2018 |
| JP | 2019-202302 | A | 11/2019 |
| KR | 20050081301 | A | 8/2005 |
| KR | 20120090175 | A | 8/2012 |
| KR | 20150103817 | A | 9/2015 |
| WO | WO-9527551 | A1 | 10/1995 |
| WO | WO-9831480 | A1 | 7/1998 |
| WO | WO-2004091750 | A1 | 10/2004 |
| WO | WO-2013/181029 | A1 | 12/2013 |
| WO | WO-2015/049544 | A1 | 4/2015 |
| WO | WO-2015/049705 | A1 | 4/2015 |
| WO | WO-2015/142863 | A1 | 9/2015 |
| WO | WO-2016/032344 | A2 | 3/2016 |
| WO | WO-2018/172725 | A1 | 9/2018 |
| WO | WO-2019/017849 | A1 | 1/2019 |
| WO | WO-2019/017850 | A1 | 1/2019 |
| WO | WO-2019/081013 | A1 | 5/2019 |
| WO | WO-2019122862 A1 * | | 6/2019 ............ B01D 33/11 |
| WO | WO-2020/012024 | A1 | 1/2020 |
| WO | WO-2020/012026 | A1 | 1/2020 |
| WO | WO-2020/012027 | A1 | 1/2020 |
| WO | WO-2020/064830 | A1 | 4/2020 |
| WO | WO-2021/014152 | A1 | 1/2021 |
| WO | WO-2021/032986 | A1 | 2/2021 |
| WO | WO-2022/084677 | A1 | 4/2022 |

OTHER PUBLICATIONS

Blog post with images, "Drum washing machine drain filter location and cleaning method/process shot" dated Aug. 14, 2017, retrieved from <https://blog.naver.com/ks1228/221073386850> on Sep. 24, 2024 (14 pages).

U.S. Appl. No. 18/265,178, Mattley et al.

International Search Report and Written Opinion for PCT/GB2022/051085, dated Sep. 9, 2022 (16 pages).

* cited by examiner

202

203

FILTER UNIT FOR FILTERING MICROPARTICLES AND A FILTER CAGE FOR USE IN A FILTER UNIT

FIELD

The present disclosure relates to a filter unit, a filter cage, a filter unit comprising the filter cage and to a textile treatment apparatus comprising either of the filter units. The present disclosure also relates to the use of the filter unit, filter cage and the textile treatment apparatus, and to methods of filtering microparticles from feed liquid containing microparticles.

BACKGROUND

The washing of synthetic textiles is believed to be the largest contributor of microplastic pollution to the world's oceans, contributing an estimated 35% of primary microplastics. The release of microplastics from synthetic clothes is caused by the mechanical and chemical stresses that synthetic fabrics undergo during a washing cycle in a laundry machine. These stresses cause the detachment of microfibres from synthetic textiles. Due to their dimensions, the released microfibres often pass through wastewater treatment plants and enter the oceans. Microfibres can be found in beaches worldwide, in the water of the Pacific Ocean, the North Sea, the Atlantic Ocean, the Artic, in deep sea sediments, and have recently been identified in human organs. Their size can cause them to be consumed by microorganisms, which are unable to digest them, causing them to persist and pass up the food chain.

A number of devices have been developed to capture microparticles. One such device is described in WO 2017/173215 and is called the Cora Ball®. The Cora Ball® has a plurality of arms with small teeth on it to capture microparticles therebetween. The Cora Ball® is placed in a washing machine and circulates with the laundry. In an independent test (I.E. Napper et al Science of the Total Environment, 738 (2020) 140412), the Cora Ball was shown to have a low filtration efficiency of 31% of microfibres collected from wastewater effluent. Most likely the Cora Ball will have to be cleaned after each use to prevent filtration efficiency from decreasing, placing additional demands on the user. The microparticles captured between the teeth of the Cora Ball require removal without washing so that the captured microparticles do not enter the wastewater system. This may entail pulling or wiping captured residue from the teeth of the Cora ball.

Another device also used inside the washing machine is the Guppy Friend® and is described in US2018320306. The Guppy Friend is a zipped laundry bag made from a porous material to trap microparticles released from the laundry. In the same independent test, the Guppy Friend was found to have a filtration efficiency of 54%. The Guppy Friend also requires emptying of trapped microparticles from the interior of the bag without the use of water. The Guppy Friend also requires the user to fill with synthetic laundry garments separate from natural fibre garments. The user must also empty the bag after each wash. This therefore places additional demands on the user.

Other devices attach externally between the outlet pipe of a washing machine and the wastewater drain. One example is manufactured by PlanetCare (www.planetcare.org) which have developed a filter that is used external to a washing machine. The filter uses a static vertical cylindrical filter media held in a chamber. Wastewater passes through the 2 filter media and out of the chamber. The filter becomes blocked, so periodically, the top of the chamber needs to be opened and the filter media extracted and replaced. The efficiency of the device was found to be 29% in the same independent test. Furthermore, most domestic drains are located at the rear of the washing machine, and the washing machine outlet pipe usually exits from the rear of the washing machine. This means the PlanetCare filter and those similar to it may need to be located in a place that is inaccessible by the user, typically the rear of the washing machine, or a pipe can be used to bring the filter to the side of the washing machine. Often this is impractical for users.

Another microparticle filter is described in WO 2019/122862 filed in the name of Xeros Limited. This filter is a centrifugal filter with a rotating filter cage, where the filter cage can be removed for emptying. This filter was found to have a filtration efficiency of 79% in the same independent tests. The filter is designed to be installed inside a washing machine. However, the present inventors have since determined that the filter described in WO 2019/122862 can be further improved such that it even better optimised for integration into domestic washing machines. Furthermore, the present inventors have since sought to improve the accessibility of the rotating filter cage described in WO 2019/122862.

The present inventors have sought to address one or more than one of the following problems:

i. A filter unit which can be easily integrated into a wider range of different washing machines, especially those currently marketed for domestic use;

ii. An improved accessibility to the filter unit;

iii. An improved ease of maintaining and emptying the filter unit especially in terms of removing filtered microparticles;

iv. A desire to integrate certain functionalities of the filter unit into the washing machine so as to provide a simple, familiar and effective user experience;

v. A desire to retain suitably high filtration efficiencies; It is an object of the present disclosure to provide improvements generally and/or to address, at least in part, one or more of the abovementioned problems.

vi. A desire to improve the user experience during emptying of the filter unit.

Additionally it was desired to provide a filter cage which could be used in a filter unit to desirably address one or more of the abovementioned problems.

SUMMARY

In a first aspect, there is a filter unit for filtering microparticles from a feed liquid containing microparticles, the filter unit comprising:

a filter chamber extending along an axis, and comprising opposing first end and second end walls and at least one sidewall extending between the first end and second end walls, wherein both first end and second end walls are coincident with the axis, and wherein the second end wall is or comprises an opening therein and a cap removable from the opening;

a filter cage contained within the filter chamber and configured to rotate about the axis, the filter cage comprising:

a first end proximal to the first end wall of the filter chamber when the filter cage is in the filter chamber wherein the first end of the filter cage comprises an opening;

a second end proximal to the second end wall of the filter chamber when the filter cage is in the filter chamber;

a filter cage sidewall between the first end and the second end, wherein the filter cage sidewall is or comprises one or more than one filter media for filtering microparticles from the feed liquid;

and wherein the filter cage is removable from the filter chamber through the opening in the second end wall of the filter chamber;

wherein the filter chamber further comprises:

an inlet configured to pass feed liquid into the filter chamber and to supply feed liquid into the filter cage via the opening at the first end of the filter cage when the filter is in the filter chamber; and an outlet for passage of filtered liquid out of the filter chamber;

the filter unit further comprises:

a connection member comprising a first seal surface and a first connection surface; and a drive shaft configured to drive rotation of the filter cage;

wherein the first seal surface is configured to cooperate with a second seal surface to provide a rotary seal permitting relative rotation therebetween and the first connection surface is configured to cooperate with a second seal surface to provide a detachable connection therebetween;

wherein the second seal surface is on the filter chamber and the second connection surface is on the filter cage or wherein the second seal surface is on the filter cage and the second connection surface is on the filter chamber.

The first aspect provides a filter unit that satisfies one or more than one of problems i to vi identified above. For example, the filter cage may be removed from the opening by a user grasping the second end of the filter cage and filtered microparticles may be emptied into a waste bin via the opening at the first end of the filter cage. This provides a number of benefits, for example, the filter unit may be emptied in one motion without the user changing their grip position on the filter cage. When the filter cage is held above a waste bin in an orientation for emptying, the opening at the first end is at the bottom and the second end at the top. In this orientation the opening is concealed from the view of the user. This means that during emptying the contents of the filter cage are concealed from view of the user, which may further improve the user experience. The filter itself is also compact and can readily fit inside the housing of a washing machine without extensive reconfiguration. The feed liquid enters the filter cage at the second end and microparticles are also emptied at the second end. This means the filter cage may be removed and emptied without having to remove excess inlet or outlet connections or lids on the filter cage for emptying.

In a second aspect, there is a filter cage for use in a filter unit for filtering microparticles from a feed liquid containing microparticles, wherein the filter cage extends along an axis and is configured to be rotatable within the filter unit about the axis and removable from the filter unit;

the filter cage comprising:

at least one filter cage sidewall extending parallel to the axis, the at least one filter cage sidewall comprising a first end and an opposing second end, the sidewall together with the first and second end defining an interior and exterior of the filter cage, wherein the filter cage sidewall is or comprises one or more than one filter media for filtering microparticles from a feed liquid, the filter media defining a filtration surface on the interior of the filter cage where filtered microparticles accumulate during filtering;

a moveable member in the interior the filter cage comprising a filtration surface cleaning portion which is proximal to the filtration surface;

a user operable portion adapted to be operated by hand on the exterior of the filter cage;

wherein the first end of the filter cage is or comprises an opening for extraction of filtered microparticles from the filter cage when the filter cage is removed from the filter unit and for supply of feed liquid into the filter cage when the filter cage is inside the filter unit; and wherein the moveable member is connected to the user operable portion so that movement of the user operable portion causes movement of the filtration surface cleaning portion relative to the filter cage to detach filtered microparticles from the filtration surface to pass out of the opening at the first end of the filter cage.

The filter cage may be used with a filter chamber as described under the first aspect or with an alternative filter chamber. An alternative filter chamber may extend along an axis, and may comprise opposing first end and second end walls and at least one sidewall extending between the first end and second end walls, wherein both first end and second end walls are coincident with the axis, and wherein the second end wall is or comprises an opening therein and a cap removable from the opening; the alternative filter cage may also comprise an inlet configured to pass feed liquid into the filter chamber and to supply feed liquid into the filter cage via the opening at the first end of the filter cage when the filter is in the filter chamber; and an outlet for passage of filtered liquid out of the filter chamber. The axis of the filter cage may be the same as the axis of the filter chamber, or alternatively may be parallel to the axis of the filter chamber.

The second aspect provides a filter cage that solves some or all of the problems identified above either alone or when used with a filter chamber. For example, the filter cage can be emptied by a user holding the filter cage above a waste bin, with the first end towards the waste bin and the second end above the first end. The user can operate the user operable portion to remove filtered microparticles adhered to the wall of the filter cage by the moveable member. This means that the user does not have to see into the filter cage or remove microparticle carrying components. Also there is no need to remove any portions of the filter cage thereby reducing the possibility of accidentally coming into contact with the filtered material. These may result in a cleaner and neater emptying operation and thus further improves the user's experience.

Filter Chamber

The filter chamber contains the filter cage and filter media and helps to direct the flow of the feed liquid from the inlet, through the filter media and out of the outlet. The filter chamber may be a closed unit. That is to say the filter chamber may be sealed water-tight during filtration when the cap is placed in the opening of the filter chamber and liquid can only enter and exit via the inlet and outlet, respectively.

The filter chamber may take a range of shapes, including substantially cylindrical, elliptical and cuboidal, amongst others. A particularly preferred shape is one that is or approximates to a cylindrical shape. Prisms based on polygons with or without smoothed edges are also examples of suitable shapes, in particular, higher order polygons i.e.

those with 5 or more sides. Alternatively, shapes with a rotational symmetry of order 2 or greater about the axis may be suitable.

The filter chamber may have a length of at least 50 mm, of at least 100 mm, of at least 150 mm, of at least 200 mm, of at least 250 mm, of at least 300 mm or of at least 400 mm.

The filter chamber length may not exceed 600 mm, or 500 mm, or 400 mm or 300 mm or 200 mm.

The filter chamber may have a diameter of at least 20 mm, or of at least 30 mm, or of at least 40 mm, or of at least 50 mm, or of at least 60 mm, or of at least 70 mm, or of at least 80 mm.

The filter chamber diameter may not exceed 110 mm, or 100 mm, or 80 mm, or 70 mm, or 60 mm, or 50 mm.

The end walls and side wall(s) may be connected to form the filter chamber, they may be connected by welding, adhesives, clips, bolts, screws, magnets, screw threads, interference surfaces and the like. At least some non-permanent connections may be preferred which include clips, bolts, screws, magnets, screw threads, interference surfaces and the like. Non-permanent connections may allow for disassembly and access into the filter chamber Alternatively, the end walls and side walls may be integrally formed.

The chamber walls may be made from engineering materials. Engineering materials may include polymers, metals, and/or ceramic materials. Non-limiting examples of suitable metals include aluminium, titanium, and alloys for example steel (including stainless steel). Polymers may include thermoset and thermoplastic polymers.

Non-limiting examples of suitable polymers include: Polyether ether ketone (PEEK), Poly(methyl methacrylate) (PMMA), Polyethylene terephthalate (PET), Polyphenylene sulfide (PPS), Poly(p-phenylene oxide) (PPO), Acrylonitrile butadiene styrene (ABS), Polybutylene terephthalate PBT, Polyether ketones (PEK), polyamides, polyimides, polyethylene, polypropylene, polycarbonates, polyacetals and polysulphones.

The first end wall and/or the second end wall may be planar or may comprise a more complex or irregular shape e.g. hemispherical, cylindrical, or conical shapes amongst many others. The first end wall and/or the second end wall may optionally be aligned perpendicular to the axis. In one embodiment the first end wall is a flanged cylinder shape.

The filter unit comprises an axis. The axis may preferably be coincident and parallel with the centre of rotation of the filter cage. The axis may also be coincident and parallel with an axis of rotational symmetry through the filter chamber or may pass through the centre of the filter chamber (i.e. coincident with the centre of mass were the chamber to be assumed to be a homogenous body). Typically, the axis may be parallel with the horizontal direction when the filter unit is installed in the treatment apparatus. The side wall or side walls of the filter chamber may extend parallel to the axis. Alternatively, the filter chamber may widen from one end to the other, optionally from the first end wall to the second end wall.

Cap and Opening

The second end wall is or comprises an opening and a cap that can be removed from the opening. The opening may be closed by the cap so that liquid cannot pass through the opening. Thus, the cap may be able to seal the opening in the second end wall. The cap can also be removed from the opening. For example, this may comprise opening a flap in which the cap is incorporated, unscrewing the cap, undoing a latch or other retaining member that holds the cap in place, amongst others. Removing the cap from an opening does not necessarily mean taking the cap away, the cap may still be retained to the filter chamber for example.

A cap may comprise any element that can be fitted to the opening in the second end wall to seal it that is removeable from the opening giving access to the interior of the filter chamber. A cap may comprise amongst others a bung, lid, a lift flap, or any physical element suitable to fill the opening. A cap may be considered as an object that may be removed from the opening so that the opening is not occluded. The cap may be detachable from the filter chamber or from any textile treatment apparatus the filter is used with, or it may be retained thereto, e.g. by means of a cord, chain, or rotatable arm.

The filter unit may comprise a retaining means to retain the cap in the opening in the second end wall. Non-limiting examples of retaining means include but are not limited to: screw threads between the cap and the second end wall; bayonet pins on one of the cap and the second end wall and bayonet channels on the other; one or more latches on the cap and/or on the second end wall; an interference fit between the cap and the second end wall; one or more sliding locking pins on the cap and/or on the second end wall; or an electromagnetic lock on one of the removable and the second end wall and a metallic or magnetic element on the other. The retaining means may be configured so that when the opening is closed by the cap, the cap imparts a biasing force inward towards the first end wall of the filter chamber. The biasing force may be opposed by the filter cage and/or by the second end wall.

The cap may be approximately cylindrical or disc shaped, and it may be sized to fit in a circular or disc shaped opening in the second end wall.

The cap and/or the second end wall may comprise a seal to prevent feed liquid escaping around the cap. Non-limiting examples of suitable seals include: X-ring seals, O-ring seals, lip seals, cone seals, V-seals, wedge seals, bellows seals, gaskets, u-cup seals, packing seals and pusher seals. In particular, where the seal is on the cap, the seal may extend around the periphery of the cap, so that when the cap is placed in the opening in the second end wall, the seal is between the cap and second end wall.

The cap may comprise a handle, knob or other suitably shaped element sized for grasping by hand. Where the cap comprises screw threads, bayonet pins or any other retaining means that require rotation, the cap may comprise a handle, knob or other shaped element that is shaped to allow the user to rotate the cap by hand. The handle, knob or other shaped element may also be configured for a user to grasp to pull the handle for withdrawing the filter cage from the filter chamber through the opening. Configured in this context may involve the handle being appropriately sized and shaped for an average user to easily disconnect the detachable connection by hand.

Inlet and Outlet

The inlet and the outlet may be considered as openings into and out of the filter chamber through which feed liquid and filtered feed liquid passes during filtration. Optionally, the inlet and/or the outlet may comprise a plurality of openings in the chamber walls, collectively referred to herein in the singular as "inlet" or "outlet". The inlet is typically the only pathway through which feed liquid may enter the filter chamber and the outlet is typically the only pathway through which filtered feed liquid exits the filter chamber during filtration.

Optionally, the inlet may be coaxial with the axis. Alternatively, the inlet may be positioned radially outwards of the axis.

Optionally, the inlet may be placed in the first end wall of the filter chamber. Alternatively, the inlet may be placed in the sidewall adjacent to the first end wall of the filter chamber or closer to the first end wall than the second end wall.

The outlet may be in the side wall, and optionally the outlet may be tangential to the side wall, that is to say filtered feed liquid may be able to exit via the outlet approximately in a direction that is at a tangent to the cylindrical wall. Preferably the side wall is a cylindrical side wall and the outlet tangential thereto. Alternatively, the outlet may be in the first or second end wall. Typically, the outlet is positioned further radially outwards from the axis than the inlet.

Filter Cage

The filter cage comprises one or more than one filter media. The filter cage may comprise a rigid structure. The filter cage may permit the one or more filter media to be rotated and in particular to be rotated without the filter media becoming significantly distorted or bent by the centrifugal forces experienced during rotation. The filter cage may comprise a rigid structure unitary with the one or more filter media or they may be separable. The filter cage may comprise one of more filter cage fixings or filter cage location components to assist in fixing or locating the one or more filter media to the filter cage. The filter cage may be formed from two rigid layers with the filter media retained in between or may be formed from a single layer with the filter media attached thereto. The filter cage may comprise a lattice structure providing a series of windows between each lattice. Optionally, the filter media may extend across each window.

The filter cage comprises a first end and a second end. The first end is the end of the filter cage adjacent to the first end wall when the filter cage is in situ in the filter chamber; and the second end is the end of the filter cage adjacent to the second end wall. Optionally, the second end of the filter cage does not comprise filter media. Thus, the second end of the filter cage may be non-porous such that feed liquid cannot pass through. The second end may comprise a solid wall, which seals the second end of the filter cage preventing feed liquid from passing through so that it may exit only via filter media. Alternatively the second end may be or may comprise an opening. The opening at the second end may comprise a member or element that can close the opening and can be removed from the opening e.g. a detachable cap or moveable member. In some embodiments, an opening in the second end of the filter cage may be closable by a movable member as described herein.

The filter cage comprises an opening at the first end of the filter cage. The opening permits liquid from the inlet to enter the filter cage and for filtered microparticles to be emptied from the filter cage via the opening. The opening may encompass at least 60%, or at least 75%, or at least 95% or 100% of the area bounded by the filter cage sidewall, when measured perpendicular to the axis at the point of the opening. For example, if the filter cage sidewall is cylindrical with a diameter of 50 mm at the opening measured from opposing inner faces of the filter cage sidewall then the area is 7854 mm$^2$.

In some embodiments the first end of the filter cage comprises an opening where an edge of the opening is coincident with the filter cage sidewall. Coincident with the filter cage sidewall may mean the opening is at least partially bounded by the inner face of the sidewall, i.e. the surface of the filter cage sidewall closest to the axis.

In some embodiments where the opening is not 100% of the area bounded by the filter cage sidewall, the filter cage may comprise a limited wall at the first end. This wall may be angled away from the second end of the filter cage.

For example, when the filter cage is held in a vertical orientation with the second end above the first end, then the limited wall may depend at least partially downwards from the filter cage sidewall e.g. the limited wall may taper inwards towards the first end wall from the first end of the filter cage.

The filter cage may enclose an interior volume, and the inlet may be arranged to deliver feed liquid to the interior volume of the filter cage via the opening.

The filter cage comprises one or more than one sidewall, referred to herein as the "filter cage sidewall" (or "sidewall of the filter cage"). The filter cage may be substantially in the form of a cylinder, an ellipsoid, or a prism. A filter cage substantially in the form of the aforementioned shapes may comprise a form that approximates to those shapes including any shape in between. A prism may be a polygonal prism wherein the polygon has a number of sides of 4 or more, e.g. 4 to 20 sides. The polygonal prism may be a regular polygonal prism. Where the filter cage is a cylinder, the sidewall of the filter cage may comprise a single cylindrical wall. Where the filter cage comprises a polygonal prism, the number of filter cage sidewalls corresponds to the number of sides of the polygon, e.g. a hexagonal prism may comprise six rectangular side walls between two hexagonal end walls. The one or more filter media are preferably located in or on the one or more side walls of the of the filter cage. Optionally where the filter media is a rigid material (e.g. a perforated metal sheet) the filter media may be comprised as the filter cage sidewall. Preferably, the filter cage is cylindrical. Preferably the length along the axis of the filter cage (i.e. measured from the second end to the first end) is greater than the width measured perpendicular to the axis.

The filter cage may be rotationally symmetrical around the axis and may be balanced with respect to rotation. By balanced with respect to rotation it is preferably meant that the filter cage will not shake or vibrate unduly when rotated e.g. when rotated at 100 rpm or 1500 rpm or 3000 rpm.

The filter cage may have a length of at least 45 mm, of at least 95 mm, of at least 145 mm, of at least 195 mm, of at least 295 mm, or of at least 395 mm. The filter cage length may not exceed 595 mm, 495 mm, 395 mm, 295 mm, or 195 mm.

The filter cage may have a width of at least 20 mm, or of at least 30 mm, or of at least 40 mm, or of at least 50 mm, or of at least 60 mm. The filter cage width may not exceed 95 mm, or 75 mm, or 65 mm, or 58 mm, or 45 mm, or 35 mm. The width may be the largest distance of the filter cage sidewall measured perpendicular to the axis. Where the filter cage is cylindrical, the width will be the diameter.

The filter cage may comprise a detachable cap. The detachable cap may be located at the second end of the filter cage and may cover a portion of an opening at the second end of the filter cage, or it may cover the entirety of the second end of the filter cage. A detachable cap may be any removable closure that prevents unfiltered feed liquid from leaving the filter cage when attached to the filter cage but is removable from the filter cage to permit access to the interior of the filter cage. A moveable member may also function as a detachable cap. The detachable cap may comprise connection means to retain the detachable cap on the filter cage. Non-limiting examples of connection means include but are not limited to: screw threads between the filter cage and the detachable cap; bayonet pins on one of the detachable cap and the filter cage and bayonet channels on the other; one or more latches and engagement members on the detachable cap and/or on the filter cage; an interference fit between the filter cage and detachable cap; or one or more sliding pins on the detachable cap and/or on the filter cage. The detachable cap may be removable from the filter cage after the filter cage has been removed from the filter chamber.

The second end of the filter cage may comprise a mechanical coupling to the cap of the filter chamber. Thus where the second end of a filter cage comprises an end wall, a moveable member or a detachable cap, the mechanical coupling may extend from any of these elements to the cap of the filter chamber. The mechanical coupling may be any connection wherein the degree of freedom of movement between the element at the second end of the filter cage and the cap of the filter chamber is reduced. In particular the mechanical coupling may restrict relative movement so that as the cap of the filter chamber is moved in a particular direction (e.g. along the axis) the second end of the filter cage is also moved in that particular direction. Optionally, removing the cap of the filter chamber from the filter chamber may pull the filter cage out of the filter chamber via the opening of the filter chamber. This may further simplify user experience saving the need to separately remove the filter cage.

The mechanical coupling may permit rotation between an element (e.g. an end wall, a moveable member, or a detachable cap) at the second end of the filter cage and the cap of the filter chamber. The coupling may permit one of the elements at the second end of the filter cage or the cap of the filter chamber to rotate relative to the other and rotation may be around the axis. The mechanical coupling may comprise a spindle. One or both of the elements at the second end of the filter cage and the cap of the filter chamber may be rotatable about the spindle. Optionally the coupling may comprise one or more bearings or bushings between the spindle and the element at the second end of the filter cage and/or the cap of the filter chamber. The spindle may be rigidly connected to one of the elements at the second end of the filter cage or the cap of the filter chamber. In one embodiment, the spindle may comprise a threaded capped bolt, the bolt connected to the element at the second end of the filter cage via a nut, and the capped end of the bolt connected to the cap of the filter cage via a bearing.

The mechanical coupling may permit limited rotation out of the axis. That is, the filter cage and cap of the filter chamber may be moved relatively via the coupling so that the axis passing through the centres of the filter cage and the cap of the filter chamber are no longer parallel. The coupling may comprise a biasing means to provide a restorative force so that the axis of the detachable cap and cap of the filter chamber return to parallel.

The coupling may comprise a spherical bearing to permit limited rotation out of the axis. A spherical bearing may also provide relative rotation around the axis as described above. Alternatively, the spindle may be flexible to permit out of axis rotation, the spindle may also provide a restorative force.

The mechanical coupling may provide support for the second end of the filter cage to prevent the filter cage moving away from the axis when it is rotated via the drive shaft.

The filter cage may be made from the engineering materials, optionally the filter cage may be made from the same engineering materials as specified for the filter chamber above.

When the filter chamber is a cylinder, or approximates or comprises a cylinder as hereinbefore described, the filter cage may rotate about the axis which is aligned parallel to the side wall of the filter chamber and which is more preferably substantially central within the filter chamber when viewed from directly along the axis, e.g. the filter chamber side walls and the filter cage are concentric when viewed from directly along the axis.

The filter cage may undergo rotation. The filter cage may be rotated at a G force at the perimeter of the filter media of at least 2G, or at least 5G, or at least 20G, or at least 40G, or at least 100G or at least 175G, or at least 250G or at least 325G or at least 450G. The G force optionally may not exceed 10,000G, or 2000G, or 1000G, or 500G at the radially outermost part of the filter cage. For a filter cage of radius r (cm), rotating at R (revolutions per minute (rpm)) and taking g as the acceleration due to gravity at 9.81 m/s$^2$, then:

$$G=1.118\times10^{-5}rR^2$$

The filter cage may have a number of revolutions per minute of at least 100, or at least 800, or at least 1000, or at least 1200, or at least 1400, or at least 1800, or at least 2000. The number of revolutions per minute of the filter media optionally may not exceed 10,000, or 5000, or 2500, or 2100.

Filter Media

The wording "a filter media" used herein equally means "one or more on more than one filter medium". The filter media may comprise a porous material. The pores of the filter media may have a mean pore size of no more than 100 μm, no more than 90 μm, no more than 80 μm, no more than 70 μm, no more than 60 μm, no more than 50 μm, no more than 40 μm, or no more than 30 μm. Such pore sizes have been found to provide excellent efficiency in the removal of microfibres whilst simultaneously not blocking too readily. In order of increasing preference, the pores in the one or more filter media have a mean pore size of at least 1 μm, at least 2 μm, at least 5 μm, at least 10 μm, at least 20 μm, or at least 30 μm. Typically, the filter media comprises pores with a mean pore size from 10 to 100 μm, or from 20 to 70 μm, or from 30 to 60 μm.

The mean pore size may be the arithmetic mean pore size. The pore size may be considered the largest linear size of the pore. In the case of a circular pore this would be a diameter. In the case of a pore taking the form of a slot this would be the length of the slot.

The mean is preferably established by optical or electron microscopy using suitable image analysis software. The mean is preferably the mean of at least 100, more preferably at least 1,000 and especially at least 10,000 pores.

The number of filter media present in the filter unit is preferably no more than 100, more preferably no more than 50, especially no more than 20 and most especially no more than 10. Preferred numbers of filter media include 1, 2, 3, 4, 6 and 8.

The filter media may comprise a mesh, a perforated sheet, woven or non-woven fibre sheet, cloth or felt, or porous material, or any other known filtration material. Where the filter media comprises a mesh, the mesh may comprise a network of wire or thread including a knitted mesh. The network of wire or thread may be non-woven or woven or may comprise a plurality of fibrous layers. The fibrous layers may optionally comprise two or more layers of fibres aligned in parallel with each layer typically in different orientations. The pores of the mesh may be formed from the different spacings between the wire or thread.

Where the filter media comprises a perforated sheet, the pores may be the perforations. A perforated sheet may include a metallic or polymeric material where the material is, punched, punctured, cut, slit, or treated by any known method to introduce perforations into the material.

Where the filter media comprises a porous material, the porous material may be a porous ceramic, a laminar surface with pores (e.g. a porous polymer membrane) or any other material that is inherently porous.

The one or more filter media may be planar in shape, more preferably the one or more filter media are curved in shape, most preferably the one or more filter media are curved such that they adopt substantially the same shape as the side wall or side walls of the filter cage.

When one filter medium is present in the filter cage, the filter medium preferably is cylindrical in shape. When a plurality of filter media are present in the filter cage, the filter media preferably in combination act so as to form an approximately cylindrical shape when arranged in the filter cage.

The feed liquid moves through the filter media in one direction and thus encounters one surface of the filter media first. This surface is where filtered microparticles may accumulate during filtration and may be referred to as the filtration surface herein. Typically the filtration surface is the surface of the filter media closest to the axis.

Connection Member

The connection member may comprise a passageway to separate unfiltered feed liquid from the inlet from mixing with filtered feed liquid in the filter chamber. The passageway may be in the form of an annular body. The bore or centre of the annular body may extend parallel with the axis and when in use may contain unfiltered feed liquid. In some embodiments, the annular body may have substantially the same width or diameter as the opening at the first end of the filter cage, or as the filter cage sidewall.

The connection member may comprise a central spindle coincident with the axis. The central spindle may connect to the drive shaft of the filter unit. Where the connection member is directly rotated by the drive shaft, the connection member may be connected to the drive shaft via radial members. Where the connection member comprises an annular body these may connect from the driveshaft to the annular body, or from a central spindle to the annular body. The radial members may be spaced to permit passage of feed liquid. The radial members may also be shaped to comprise a face orientated so as to be rotated into unfiltered feed liquid as the connection member is rotated. Thus the radial members may optionally also be impellor blades. The connection member may also comprise impellor blades on the exterior of the annular body, which may depend radially outwards from the annular body and may be configured to rotate filtered feed liquid in the filter chamber. Impellor blades on the exterior of the annular body may be referred to as external impellor blades herein and impellor blades on the interior of the annular body may be referred to as internal impellor blades.

In some embodiments, the connection member may be an intermediate component between the first seal surface and the first connection surface. For example, the connection member may be an annular ring with the first seal surface and the first connection surface on opposing sides. Further, the first seal surface and the first connection surface may be adjacent or in contact with each other on the connection member or share common elements, in which case, the connection member may be the region between the first seal surface and the first connection surface.

The connection member may comprise an annular seal member on which the first seal surface is located. The annular seal member may be a lip seal. The connection member may also comprise a seal retention member to secure the annular seal member to the connection member. Alternatively the annular seal member may be integrally formed or fixed by other means (e.g. adhesives). The seal retention member may be a rigid annular component that is affixed to the connection member to retain the annular seal member to the connection member. The rotary seal may be formed between the first seal surface on the annular seal member and the second seal surface.

The second aspect may comprise a connection member as described for the first aspect.

Drive Shaft

The drive shaft is configured to drive the rotation of the filter cage. The drive shaft may be connected directly to the filter cage so that rotation of the drive shaft rotates the filter cage directly without driving any intermediate component. Where the drive shaft is connected directly to the filter cage, the direct connection may comprise a disconnectable shaft connection. The disconnectable shaft connection may be disconnectable to separate the drive shaft into two portions, one portion attached to and removable with the filter cage, the other portion retained in the filter chamber. The disconnectable shaft connection may be separable in a direction parallel to the axis. When the portions of disconnectable shaft connection are connected, torque may be transferred between the two portions. The disconnectable shaft connection may comprise two mating surfaces with reciprocally shaped features, i.e. a profile or profiles on one or both mating surfaces and a corresponding reciprocally shaped recess or recesses on the other surface. Non-limiting examples of reciprocally shaped features may include splines and grooves, pins and slots, aligned teeth and radially aligned stepped faces, amongst others. The drive shaft may connect to the filter cage via one or more radial members which extend radially outwards from the drive shaft to the filter cage. The radial members may comprise spacings or openings therebetween to permit flow of feed liquid. The radial members may optionally also be configured by being sized and shaped to function as impellor blades.

Alternatively, the drive shaft may be connected indirectly to the filter cage so that rotation of the drive shaft rotates one or more intermediate components which in turn rotates the filter cage. An example of an intermediate component may include but is not limited to the connection member. The drive shaft may connect to the intermediate component with one or more radial members which extend radially outwards from the drive shaft to the intermediate component. The radial members may comprise spacings or openings therebetween to permit flow of feed liquid. The radial members may optionally also be configured by being sized and shaped to function as impellor blades. In some embodiments, the radial members may be internal impellor blades of the connection member. Alternatively the drive shaft may connect to the connection member via a central spindle of the connection member.

In some embodiments, the drive shaft may extend at least from the first end wall of the filter chamber to the intermediate component or to the filter cage. The drive shaft may pass through the first end wall of the filter chamber. The first end wall may comprise a bearing. The bearing may comprise a plain bearing or roller element bearing in which the drive shaft is rotatably mounted. The bearing may be a sealed bearing unit, or one or more seals may be adjacent to the bearing to prevent feed liquid from exiting the filter chamber via the bearing.

The drive shaft may comprise a mechanical connection to a drive means. A mechanical connection to the drive means may comprise a pulley to connect via a belt to a drive means, a gear to connect to one or more gears of a drive means, a chain between two sprockets, or a direct connection to a drive means (e.g. a coupling). Where the drive means is a motor, the direct connection may be for example, the drive shaft being connected to or integrally formed with the rotor of the motor or coupled via a coupling.

Optionally, the drive shaft may be hollow. Feed liquid may pass through the centre of the hollow drive shaft. The drive shaft may pass through the first end wall, and the inlet may be within the hollow of the drive shaft, and within the first end wall. A hollow drive shaft may also extend to the first end of the filter cage or to the connection member. A hollow drive shaft may permit supply of feed liquid into the interior of the filter cage either directly or via a connection member.

Drive Means

The filter unit may comprise a drive means. The drive means may comprise a motor, optionally an electric motor. The electric motor may comprise a rotor. The rotor of the motor may be concentric with the axis and drive shaft. Alternatively, the motor may be located remote from the axis, e.g. the rotor of the motor may rotate about an axis parallel to but not coincident with the axis of the filter chamber.

Impellor

The filter cage may comprise an impellor. The impellor may comprise a plurality of blades sized and shaped to push water as the filter cage rotates. The impellor rotates with the filter cage to rotate the feed liquid in the filter chamber. The impellor may assist in pumping or driving feed liquid through the filter unit and out of the outlet and/or may assist in pumping or driving the feed liquid through the one or more filter media. The impellor may comprise from 1 to 10, more preferably from 3 to 10 and especially 4, 5 or 6 impellor blades. The impellor blades may take any shape suitable for rotating feed liquid in the filter chamber. In particular, the impellor blades may comprise a face aligned in the radial direction from the axis so that when rotated, the face is pushed into the feed liquid to rotate it around the filter chamber. The impellor blades may be linear and may extend along the length of the filter cage and parallel to the axis, or they may be non-linear relative to the axis (for example, they may be helical around the axis).

The impellor blades may be radially inwards from the filter media (e.g. in the interior of the filter cage). The impellor blades may be radially outwards of the filter cage (e.g. on the exterior of the filter cage).

The impellor may be removable from the interior or exterior of the filter cage. Alternatively, the impellor may be attached to or be integrally formed with the filter cage. Where the impellor is removable, the impellor may comprise an assembly of multiple connected impellor blades. Thus, removal of the impellor removes all blades simultaneously. In particular, the impellor may comprise a plurality of evenly spaced linear blades interconnected with rigid radial or circumferential elements.

In embodiments comprising a moveable member, the impellor blades may be incorporated into the moveable member. In particular, the moveable member may comprise one or more blades that function as an impellor and are also configured to provide a surface cleaning portion on the blade that is moved relative to the filtration surface of the filter media to remove filtered microparticles from the filtration surface.

First Seal Surface

The first seal surface may be any surface which in combination with a second seal surface forms a seal that prevents passage of feed liquid and permits relative rotation between the first and second seal surfaces. In some embodiments the first seal surface may remain static during filtration whilst the second seal surface rotates relative thereto. Alternatively, the second seal surface may remain static during filtration whilst the second seal surface rotates relative thereto. The first seal surface may be located on an annular seal member which is comprised as part of the connection member or it may be a surface on the connection member.

The annular seal member may be an annular lip seal, X-Ring seal, O-ring seal, cone seal, V-seal, wedge seal, bellows seal, u-cup seal, packing seal, pusher seal or other conformable element. Optionally, the annular seal member may be an annular lip seal and the first seal surface may be the radially inner most surface of the annular seal member. In some embodiments, the first seal surface may face radially inwards, radially outwards, or towards the first end wall of the filter chamber.

The second aspect may comprise a first seal surface as described for the first aspect.

Second Seal Surface

The filter unit of the first aspect comprises a second seal surface which may be located on the filter cage or on the filter chamber. In embodiments where the second seal surface is located on the filter chamber, in particular, the second seal surface may be located on one of the walls of the filter chamber, e.g. the first end wall, sidewall or inlet extension of the first end wall. In some embodiments, the second seal surface may be located on the radially outermost surface of the inlet extension.

In embodiments where the second seal surface is located on the filter cage, this may be adjacent to the first end of the filter cage.

The second seal surface may be on an annular seal member which is itself may be comprised as part of the filter chamber walls or filter cage. The annular seal member may be an annular lip seal, X-Ring seal, O-ring seal, cone seal, V-seal, wedge seal, bellows seal, u-cup seal, packing seal, pusher seal or other conformable element. Optionally, the annular seal member may be an annular lip seal and the second surface may be the radially outermost surface of the annular seal member.

In some embodiments, the second seal surface may face radially inwards, radially outwards, or towards the first end wall of the filter chamber.

In some embodiments, the first and second seal surface may also form parts of a rotary bearing. The rotary bearing may be a plain bearing or a rotary element bearing amongst other bearing types.

The second aspect may comprise a second seal surface as described for the first aspect.

As referred to herein a rotary seal may be considered to be a seal between two surfaces that rotate relative to each other.

First Connection Surface

The first aspect comprises a first connection surface. The first connection surface may be any surface configured to cooperate with the second connection surface. The first and second connection surface may work in combination to provide a detachable connection therebetween. A detachable connection may comprise a connection where the two surfaces can be joined together to be retained adjacent to each other and where the two surfaces can be detached or disconnected. An example of a detachable connection is a push fit connection, where the two surfaces can be pushed together so that the surfaces are retained adjacent to each other. A push fit connection can then be separated by applying a force sufficiently large to overcome the push fit connection. Another example of a detachable connection is a twist lock connection where the two surfaces can be rotated relative to one another in one direction so that the surfaces are retained adjacent to each other. Rotation in the opposite direction may disconnect the two surfaces. The first and second connection surfaces may be configured by being sized and shaped relative to one another so that the two surfaces work in combination.

In some embodiments, the first connection surface may comprise an annular surface on the connection member. The annular surface may be the surface facing radially inwards or radially outwards.

The first connection surface may comprise compliant or conformable material on a portion thereof. In a non-limiting example, the first connection surface may comprise a rubber O-ring retained against it.

The second aspect may comprise a first connection surface as described for the first aspect.

Second Connection Surface

The filter unit of the first aspect comprises a second connection surface which may be located on the filter cage or on the filter chamber. In embodiments where the second connection surface is located on the filter chamber, the second connection surface may be located on one of the walls of the filter chamber. This may optionally include the first end wall and the side wall or the inlet extension part of the first end wall. In embodiments where the second connection surface is located on the filter cage, this may be adjacent to the first end of the filter cage.

In some embodiments, the second connection surface may comprise an annular surface on the filter chamber walls or filter cage. The annular surface may be the surface facing radially inwards or radially outwards.

The second connection surface may comprise compliant or conformable material on a portion thereof. In a non-limiting example, the first connection surface may comprise a rubber O-ring or other seal type.

The second aspect may comprise a second connection surface as described for the first aspect.

In some embodiments, the second seal surface is on the filter chamber and the second connection surface is on the filter cage. In such embodiments, the connection member may not be removable from the filter chamber. In such embodiments, the connection member may not rotate during filtration.

In some embodiments, the second seal surface is on the filter cage and the second connection surface is on the filter chamber. In such embodiments, the connection member may be removable from the filter chamber with the filter cage. In such embodiments, the connection member rotates during filtration.

Air Bleed and Secondary Drain

When the outlet is located at the vertically lowermost part (i.e. the bottom) of the filter chamber, the maximum volume of filtered feed liquid can drain under gravity out of the outlet. Therefore, the filter unit can be fully drained of feed liquid after filtration in this configuration. However, air may accumulate at the top of the filter chamber as the filter chamber is filled with feed liquid. The filter unit may comprise an air bleed outlet at the vertically uppermost part of the filter chamber to remove the air. The air bleed outlet may comprise a valve operable to permit air to escape from the filter chamber when the filter chamber contains feed liquid. The valve may be opened during initial filling of the filter chamber with feed liquid or shortly thereafter. The valve may close after air has been bled from the filter chamber. The valve may comprise a float valve or any valve comprising a buoyant element to operate the valve. The valve may be closed upon detection of liquid by a liquid sensor or after a predetermined time, the valve may then remain closed throughout filtration. The air bleed outlet may be connected to the wastewater drain or to the outlet of the filter chamber, therefore any liquid passing through the air bleed outlet may be returned to a wastewater drain.

When the outlet is located at the vertically uppermost part (i.e. the top) of the filter chamber, air can exit the filter chamber via the outlet. However, after filtration a volume of filtered feed liquid may be retained in the filter unable to be drained out of the outlet via gravity. The filter chamber may further comprise a secondary drain outlet at the vertically lowermost part (i.e. bottom) of the filter chamber. The secondary drain outlet may be operable to drain retained filtered feed liquid from the filter chamber when supply of feed liquid has stopped. The secondary drain outlet may comprise a valve. The valve may remain closed during filtration and may be opened after filtration to drain retained filtered feed liquid. The secondary drain outlet may connect to the outlet of the filter chamber or to a wastewater drain.

The vertically upper- or lower-most parts of the filter chamber may refer to the parts of the filter chamber when the filter unit is in use that are the topmost or bottommost regions of the filter chamber relative to the vertical direction. When the filter unit is in use, the filter unit will typically be orientated so that the axis aligned in the horizontal direction. The vertically uppermost part of the filter chamber may typically be the region in the filter chamber where air may accumulate and the vertically lowermost part of the filter chamber where water may accumulate first under the influence of gravity.

Moveable Member

The filter cage of the second aspect comprises a moveable member located in the interior of the filter cage. The moveable member comprises one or more filtration surface cleaning portions which are proximal to the filtration surface of the filter media. Movement of the filtration surface cleaning portion relative to the filtration surface to detaches filtered microparticles from the filtration surface. The filtration surface cleaning portion may contact the filtration surface or may be close to the filtration surface.

In some embodiments, the filtration surface cleaning portion may comprise a brush or a scraper element for intimate contact with the filtration surface. A scraper element may comprise a thin conforming blade formed of a flexible material e.g. rubber.

In some embodiments, the moveable member may rotate about the axis to rotate the filtration surface cleaning portion around the inner circumference of the filter cage. Alternatively, the moveable member may move linearly, parallel to the axis. The linear motion of the moveable member may be from the first end of the filter cage to the second end or may be from the second end to the first end of the filter cage.

In some embodiments, the movable member may be removable from the interior of the filter cage. The moveable member may be removable from the first end and/or from the second end of the filter cage. The movable member may be removable from the interior of the filter cage by moving in a direction parallel to the axis only.

In some embodiments, the moveable member comprises one or more blades which extend along the length of the filter cage sidewall. The one or more blades may be linear and optionally may extend parallel to the axis. The movable member may comprise any number of blades. The moveable member may comprise 1, 2, 3, 4, 5, 6, 7, 8, 9, 10 or more than 10 blades. The blades may be equally spaced around the axis. The one or more blades may be configured to function as an impellor when the filter cage is rotating.

The filter cage may be configured so that the one more blades rotate with the filter cage when the filter cage is rotating, but rotate relative to the filter cage when rotated by the user operable portion. In some embodiments, when the filter cage is in a filter chamber, the blades may connect to the drive shaft or to the connection member (optionally a central spindle thereof) so that drive may be transferred, and/or so that movement of the blades perpendicular to the axis is prevented.

The movable member may comprise a secondary filtration surface cleaning portion which is proximal to the filtration surface and is configured to remove filtered microparticles from the filtration surface when the movable member is removed from the filter cage. The secondary filtration surface cleaning portion may have a shape that matches the interior of the filter cage. For example where the interior of the filter cage is circular (when viewed perpendicular to the axis) the secondary filtration surface cleaning portion may be annular, arcuate, or circular in shape to conform to the interior of the filter cage. The secondary filtration surface cleaning portion may have a tapered edge that points along the axis and is in contact with the filtration surface. The secondary filtration surface cleaning portion may comprise a flexible element for intimate contact with the filtration surface.

User Operable Portion

The filter cage of the second aspect comprises a user operable portion adapted to be operated by a user's hand on the exterior of the filter cage. The user operable portion is thus accessible on the exterior of the filter cage by a user's hand. The user operable portion may be adapted by being sized and shaped to be ergonomically usable by hand. For example, the diameter or width of the user operable portion may be of a size appropriate to be grasped between fingers and thumb. The user operable portion may extend on the exterior of the filter cage parallel to the axis for at least 5 mm or at least 10 mm or at least 15 mm or at least 20 mm. The user operable portion may comprise a textured surface to improve grip, e.g. a knurled surface or a surface comprising a series or ridges or troughs. In some embodiments, the user operable surface may approximate a polygonal, annular or disc shaped structure, the centre of which passes through the axis. The external surface of the polygonal, annular or disc shaped structure may be the surface of the user operable portion grasped by the user's hand during operation. The diameter or width of the polygonal, annular or disc shaped structure may equal approximate that of the filter cage. In some embodiments the diameter or width of the polygonal, annular or disc shaped structure may exceed the diameter of the filter cage, optionally by no less than 1 mm, or no less than 2 mm or no less than 5 mm, and/or by no more than 20 mm or no more than 15 mm or no more than 10 mm or no more than 5 mm.

In some embodiments the user operable portion is adapted to be rotated around the axis by hand, relative to the filter cage. In some embodiments, the user operable portion may be adapted to be moved linearly and parallel to the axis. Where the user operable portion is adapted to be moved linearly and parallel to the axis, the user operable portion may be moved from adjacent to the second end towards the first end to remove microparticles from the filter cage, then restored to adjacent the second end. The filter cage may comprise grooves or channels on the filter cage sidewall for the user operable portion to slide linearly in. In some embodiments where the user operable portion moves linearly, the moveable member may also move linearly.

In some embodiments the user operable portion is proximal to the second end of the filter cage. In particular, the user operable portion may be located between the second end of the filter cage and the second end wall of the filter chamber when in situ in the filter chamber. In some embodiments the user operable portion may be positioned radially outwards of the filter cage. Position of the user operable portion may be considered to be the position before movement of the user operable portion for removing microparticles.

In the second aspect the moveable member is connected to the user operable portion so that movement of the user operable portion causes movement of the filtration surface cleaning portion relative to the filter cage to detach filtered microparticles from the filtration surface to pass out of the opening at the first end of the filter cage. The connection may be direct, i.e. the movable member and user operable portion may be integrally formed from the same contiguous material or fixedly secured fasteners or adhesives. The connection may be non-direct such as via mechanical components i.e. they may be connected via, intermediate components such as gears, axles, struts, and pivots etc. Alternatively, the connection may be magnetic. Where the moveable member is directly connected to the user operable portion, the user operable portion may be considered to be the portion external to the filter cage and the movable member the portion in the interior of the filter cage.

In some embodiments, rotation of the user operable portion causes the moveable member to rotate. Rotation of the user operable portion may cause direct rotation of the moveable member, that is as the user operable portion is rotated through an angle, the movable member will rotate simultaneously through the same angle.

In some embodiments, rotation of the user operable portion may move the moveable member linearly. In a non-limiting example, rotation of the user operable portion may rotate a threaded element in the filter cage. The moveable member may be connected to the threaded element and adapted to move linearly without rotation in the filter cage. Thus, rotation of the user operable portion may rotate the threaded element causing the moveable member to move linearly.

In some embodiments, linear motion of the user operable portion causes linear motion of the moveable member. In a non-limiting example, a user operable portion may be configured to slide on the exterior of the filter cage may and may be connected via magnets to a moveable member on the interior of the filter cage configured to slide linearly.

The user operable portion or moveable member and/or filter cage may comprise connection means to retain the user operable portion or moveable member to the filter cage. Non-limiting examples of connection means include but are not limited to: screw threads between the filter cage and the user operable portion or moveable member; bayonet pins on one of the user operable portion or moveable member and the filter cage and bayonet channels on the other; one or more latches and engagement members on the user operable portion or moveable member and/or on the filter cage; an interference fit between the filter cage and user operable portion or moveable member; or one or more sliding pins on the user operable portion or moveable member and/or on the filter cage. Where the user operable portion is configured to rotate, the connection means may permit rotation between the user operable portion and the filter cage. The connection means may also comprise bearings and/or a shaft to permit rotation. For example, a bearing may be retained at the second end of the filter cage with an axle therethrough. The moveable member may be at one end of the axle and the user operable portion at the other, thus retaining both to the filter cage.

In some embodiments, the user operable portion may be configurable between a first configuration where the user operable portion cannot move relative to the filter cage, and a second configuration where the user operable portion can move relative to the filter cage. In some embodiments, the user operable portion is free to rotate in the second configuration but prevented from rotation in the first configuration.

In some embodiments, one of the user operable portion and the filter cage may comprise one or more latches to engage with one or two or more than two engagement members on the other of the user operable portion and the filter cage. In some embodiments, the latches may be located on the user operable portion and the engagement member or members on the filter cage. In some embodiments, the user operable portion or the filter cage may comprise 1, 2, 3, 4, 5 6, or more than 6 latches. In some embodiments, latches may be equidistantly spaced around the exterior of the user operable portion or the filter cage.

In some embodiments, the user operable portion or the filter cage may comprise two engagement members. When the latch or latches engages with the first engagement member the user operable portion may be in a first configuration where the user operable portion cannot move relative to the filter cage. When the latch or latches engages with the second engagement member the user operable portion may be in a second configuration where the user operable portion can move relative to the filter cage. The engagement portions may be annular and may extend around the filter cage or user operable portion to permit the latch or latches to rotate through 360 degrees whilst remaining engaged. Where the first and second engagement portions are comprised on the filter cage, the first engagement portion may be located closer to the first end of the filter cage than the second. Thus when the latch or laches engage the second engagement portion the moveable member may be further away from the first end than when engaged with the first engagement portion. Alternatively, the two engagement portions may be on the user operable portion. In which case, the first engagement portion may be the one located furthest from the first end.

The filter cage and the user operable portion may comprise reciprocally shaped features that engage when the filter cage is in the first configuration and disengage when in the second configuration. Non-limiting examples of reciprocally shaped features include teeth and corresponding ribs to engage with the teeth. In some embodiments a plurality of teeth may be located adjacent or on the second end filter cage and ribs may be located on the user operable portion, or visa versa.

In some embodiments, the filter unit of the first aspect may comprise a moveable member and/or a user operable portion as described for the second aspect.

In some embodiments, where the filter cage comprises an opening at the second end, the movable member and/or user operable portion may close a first end of the filter cage, to prevent unfiltered feed liquid from exiting via the second end. Where the moveable member is removable from the filter cage by the second end, another opening may be presented in the filter cage for access, maintenance, or additional emptying. Thus, the movable member may also function as a detachable cap of the filter cage.

Third Aspect

According to a third aspect there is provided a filter unit comprising:
a filter chamber extending along an axis, and comprising opposing first end and second end walls and at least one sidewall extending between the first end and second end walls, wherein both first end and second end walls are coincident with the axis, and wherein the second end wall is or comprises an opening therein and a cap removable from the opening;
a filter cage according to the second aspect contained within the filter chamber and configured to rotate about the axis, wherein the filter cage is removable from the filter chamber through the opening in the second end wall; and
wherein the filter chamber further comprises an inlet configured to pass feed liquid into the filter chamber to supply feed liquid into the filter cage via the opening at the first end of the filter cage when the filter is in the filter chamber; and an outlet for passage of filtered liquid out of the filter chamber.

A filter unit according to the third aspect may additionally comprise:
a connection member comprising a first seal surface and a first connection surface; and a drive shaft configured to drive rotation of the filter cage;
wherein the first seal surface is configured to cooperate with a second seal surface to provide a rotary seal permitting relative rotation therebetween and the first connection surface is configured to cooperate with the second connection surface to provide a detachable connection therebetween;
wherein the second seal surface is on the filter chamber and the second connection surface is on the filter cage or wherein the second seal surface is on the filter cage and the second connection surface is on the filter chamber.

Any of the filter chamber, connection member and/or drive shaft of the third aspect may comprise any as described herein in relation to the first aspect.

Operation

The filter unit of the first aspect or third aspect may be operable as a centrifugal filter or operable to use centrifugal force for filtering microparticles from a feed liquid containing microparticles. A filter unit operable as a centrifugal filter or operable to use centrifugal force for filtering microparticles may rotate the feed liquid to drive the feed liquid through the filter media. Rotation may cause a pressure gradient to build up, driving fluid through the filter media and out of the filter cage. Optionally, rotation of the feed liquid may also pump the feed liquid through the filter unit. The filter cage of the second aspect is useable in a filter chamber to operate as a centrifugal filter or operable to use centrifugal force for filtering microparticles from a feed liquid containing microparticles.

In order of increasing preference, the filter unit of the first aspect or third aspect, or a filter chamber comprising a filter cage of the second aspect may filter the feed liquid from at least 2, at least 5, at least 10, at least 15, at least 20, at least 30, at least 50 and at least 100 textile treatment cycles before requiring any emptying or cleaning. The necessity for cleaning can be established where the flow rate drops below 50% of its initial rate or more preferably where the abrupt reduction in the flow rate is noted.

Typically, microparticles may (only) be removed from the filter chamber when filtered feed liquid has been drained from the filter chamber. Optionally, microparticles may only be removed from the filter chamber when filter feed liquid has been drained to below the lowest point of the opening in the second end wall of the filter chamber.

The filter unit of the first aspect or third aspect may be operable to extract filtered microparticles from the filter chamber by removing the filter cage when the filtered microparticles are in a dewatered state. The filter cage of the second aspect may be removable from a filter chamber after filtered microparticles are in a dewatered state. A dewatered state may comprise a microparticle containing filter residue where the water content of the filter residue has been reduced from a suspension or surplus of water until the filter residue is in the non-flowable state. A non-flowable state may be considered to be a state where the filter residue has a high quantity of solids compared to liquid, i.e. the residue may resemble a slurry, paste-like or damp particulate material, or substantially dry particulate material. A high quantity of solids compared to liquid may be considered to be the filter residue comprising at least 50% by mass of solids, at least 75% of solids or at least 90% by mass of solids, and optionally up to 98% by mass of solids, or up to 100% by mass of solids. Dewatered filter residue may optionally comprise filter residue where the water content has been reduced until the filter residue comprises a high quantity of solids compared to liquid as defined above. Dewatered microparticles may be removed from the filter chamber in the filter cage or on an extraction element.

The filter unit of the first aspect, third aspect or the filter cage of the second aspect may be operable to dewater filtered microparticles using centrifugal force. That is, after filtration water may be drained from the filter chamber and the filter cage rotated to remove water from the filter residue containing microparticles. Rotation may continue until a dewatered state as defined above is achieved. Optionally, rotation to dewater the filtered microparticles may take place at a higher G force than rotation during filtration. Optionally a filter operable to dewater may comprise a filter cage rotatable at at least 1,000, or at least 1,200, or at least 1,400, or at least 1,800, or at least 2,000, or at least 5,000 or at least 10,000 revolutions per minute.

The filter unit of the first aspect or third aspect may comprise an outlet at an uppermost part of the filter chamber and a secondary drain outlet at a lowermost part of the filter chamber. The secondary drain outlet may comprise a valve. The valve may be closed during filtration and/or may be open during filtration.

Feed Liquid

The feed liquid may be a liquid effluent from a textile treatment apparatus. Preferably, the feed liquid is not in the form of a paste, sludge or semi-solid. The feed liquid is preferably an aqueous liquid. When the feed liquid comprises liquids other than water these may be alcohols, ketones, ethers, cyclic amides, and the like. Preferably, the feed liquid comprises at least 50 wt %, more preferably at least 80 wt % and most especially at least 90 wt % of water.

The feed liquid comprises microparticles. The term "microparticles", as used herein may refer to any particulate material having a longest linear dimension of less than 1 mm, or less than 0.5 mm or less than 0.1 mm. Microparticles may have a longest linear dimension no less than 1 μm. The longest linear dimension can be measured by optical or electron microscopy with suitable image analysis software. The microparticles may be microparticles derived from textiles, in particular from fibres and filaments of textiles, and may in particular be microfibres.

The feed liquid may also comprise larger particles, e.g. particles with a dimension larger than 1 mm. The term "solid material" used herein may refer to the microparticles and optionally the larger particles in a feed liquid.

The feed liquid may comprise less than 30 wt. %, or less than 20 wt. % or less than 10 wt. % of solid material prior to entry into the filter unit (as a percentage of the total mass of the solid material and the liquid). The feed liquid may comprise at least 0.001 wt. %, or at least 0.01 wt. %, or at least 0.1 wt % of solid material (as a percentage of the total mass of the solid material and the liquid).

The feed liquid may comprise from about 0.01 wt. % to about 5 wt. % solid material, or from about 0.1 wt. % to about 3.5 wt. % solid material (as a percentage of the total mass of the solid material and the liquid).

The inlet of the filter unit may be connected to the outlet of a textile treatment apparatus. The feed liquid from the textile treatment apparatus may be an effluent feed. The words "effluent feed" preferably refers to the feed liquid originating from the effluent from a cycle of textile treatment apparatus e.g. a wash cycle.

Alternatively, the feed liquid may be a polishing feed of a textile treatment apparatus. By the words "polishing feed" we preferably mean the liquids present in the textile treatment apparatus during some portion of the textile treatment cycle. Typically, the polishing feed is recycled between the filter unit and the textile treatment apparatus.

Microfibres

The microparticles may be or may comprise microfibres. In particular, the filter unit of the first aspect or third aspect may be able to filter microfibres from a feed liquid containing microfibres. The term "microfibres" as used herein preferably means microfibres having a longest linear dimension of less than 1 mm. Preferably, in order of increasing preference, the microfibres have a longest linear dimension of no more than 500 μm, no more than 250 μm, no more than 200 μm, no more than 150 μm, or no more than 100 μm.

The term microfibres can additionally or alternatively mean fibres having a diameter of less than ten micrometres.

The longest linear dimension and the diameter can be measured by optical or electron microscopy with suitable image analysis software. Preferably the longest linear dimension and/or the diameter of the microfibre is a mean. The mean is preferably an arithmetic mean. The arithmetic mean is preferably established from measuring at least 100, more preferably at least 1,000 and especially at least 10,000 microfibres.

Microfibres can be or comprise a synthetic material, a semi-synthetic material or a natural material or a blend thereof. Microfibres comprising a synthetic material include but are not limited to those that derive from polyamide, polyester, and acrylic. Microfibres comprising natural material include but are not limited to those that derive from wool, cotton, and silk, in particular, those that comprise cellulose.

Efficiency, Flow Rate and Filtered Feed Liquid

Filtered feed liquid may refer to feed liquid that has passed through the filter media. The filtered feed liquid is feed liquid that has had a proportion of microparticles removed by filtration. As used herein, the term "efficiency" may refer to the percentage of microparticles by mass removed from the feed liquid.

The filter unit, filter cage textile treatment apparatuses, methods and uses disclosed herein are in order of increasing preference capable of removing at least 70%, at least 80%, at least 90%, at least 95% and at least 99% by dry mass relative to all the microparticles originally present in the feed liquid.

The efficiency can be established by filtering any feed liquid. The efficiency can be measured across a range of types of microparticles. Preferably, the efficiency is established by firstly capturing and measuring the dry weight all of the microparticles from any treatment cycle collected using a filter bag having a pore size of 1 micron. The dry mass $W_{totav}$ is usually an average. $W_{tot}$ is itself given by $W_{f1}-W_{i1}$ where $W_{f1}$ is the final dry weight of the 1 micron filter bag plus the dry microparticles collected and $W_{i1}$ is the dry weight of the initial filter bag prior to filtration. $W_{totav}$ is simply the average of the $W_{tot}$ values, typically the average of $3 \times W_{tot}$ values.

In a similar way, secondly any small amounts of microparticles which have passed through the filter unit or filter cage can be established by capturing and measuring the dry weight of microparticles in the feed liquid after it exits the filter unit or filter cage and as collected on a 1 micron filter bag. This dry mass of microparticles having passed through the filter unit is $W_{nc}$ which is itself calculated by $W_{f2}-W_{i2}$ where $W_{f2}$ is the final dry weight of the 1 micron filter bag plus the dry microparticles collected and $W_{i2}$ is the dry weight of the initial filter bag prior to filtration.

The efficiency is then given by $(W_{totav}-W_{nc})/W_{totav} \times 100$.

Drying of the filter bag and the filtered microparticles is preferably performed at a temperature of 50 degrees Celsius for a period of a least 12 hours.

In order of increasing preference the flow rate of the feed through the filter unit is at least 1 litre/minute, at least 2 litres/minute, at least 3 litres/minute, at least 4 litres/minute, at least 5 litres/minute, at least 6 litres/minute, at least 7 litres/minute, at least 8 litres/minute, at least 9 litres/minute, at least 10 litres/minute, at least 15 litres/minute, at least 20 litres/minute, at least 25 litres/minute, at least 30 litres/minute, at least 35 litres/minute, or at least 40 litres/minute. Typically, the flow rate will be no more than 1000 litres per minute, 500 litres per minute, 100 litres per minute or 50 litres per minute.

In order of increasing preference, the filter unit has a capacity of at least 100 ml, at least 250 ml, at least 500 ml, at least 750 ml, at least 1,000 ml or at least 2,000 ml. Typically, the filter unit has a capacity of no more than 20,000 ml, no more than 10,000 ml, no more than 5,000 ml, no more than 3,000 ml, no more than 2,000 ml, or no more than 1,000 ml.

The capacity is typically measured by filling the filter chamber with water until full. This is typically done with water at a temperature of 20 degrees Celsius.

In order of increasing preference, the ratio of flow rate: capacity is at least 0.5:1, at least 1:1 at least 2:1, at least 3:1, at least 4:1, at least 5:1, at least 6:1, at least 7:1, at least 10:1, at least 15:1, at least 20:1, or at least 25:1 when the flow rate is expressed in litres/minute and the capacity is expressed in litres.

The ratio of flow rate:capacity is typically no more than 1000:1, more typically no more than 500:1, or no more than 100:1.

Textile Treatment Apparatus

According to a fourth aspect, there is provided a textile treatment apparatus comprising:

a housing comprising a front face accessible by a user and a door therein;

a filter unit according to the first or third aspects located within the housing;

a drum contained within the housing, the drum comprising an interior volume and an open end aligned with the door of the front face of the housing.

The textile treatment apparatus may be any apparatus suitable for treating textiles. In particular the textile treatment apparatus may be suitable for washing textiles. In particular the textiles may comprise natural fibres (e.g. cellulose containing fibres), synthetic fibres (e.g. polyester) or a combination or natural and synthetics fibres. The textiles may comprise woven fibres. In particular the textiles may comprise garments.

The textile treatment apparatus may be adapted for washing textiles with a treatment formulation comprising a liquid, the drum may be suitable for rotating the textiles and the treatment formulation. The textile treatment apparatus may comprise a drive unit for rotating the drum and a filter unit according to the first aspect or third aspect. In particular, the textile treatment apparatus may be a washing machine.

The textile treatment apparatus may comprise a detergent drawer located in the front face of the housing. The detergent drawer may be moveable between a closed configuration and an open configuration. In the open configuration a user is able to add textile cleaning agent (for example, detergent). The filter unit may be located behind detergent drawer. The opening and removable lid at the second end wall of the filter unit may be accessible by a user through the detergent drawer when the detergent drawer is in the open configuration.

The detergent drawer may be mechanically connected to the cap of the filter chamber. Opening of the detergent drawer may pull the cap away from the filter chamber. Similarly, closing the detergent drawer may also return the cap to close the filter chamber. In these embodiments, the filter cage may be coupled to the detergent drawer via the cap. Therefore, as the detergent drawer is opened, the filter cage may be extracted from the filter chamber. Likewise, as the detergent drawer is closed, the filter cage may be returned to the filter chamber and or the cap replaced in the opening.

Alternatively, the opening and cap of the filter chamber may be directly accessible in the front face of the housing, such that it is accessible by a user, or the opening and cap may be covered by a flap or panel of the housing.

The inlet of the filter unit may be connected to the textile treatment machine so that the feed liquid is from a treatment cycle of the textile treatment apparatus. Where the textile treatment apparatus is a washing machine, the feed liquid may be effluent from a wash cycle.

The outlet of the filter unit may be connected to a drain of the textile treatment apparatus. The drain of the textile treatment apparatus may connect to a wastewater drain (e.g. a connection to a sewer system).

A textile treatment machine may include machines adapted for colouring (e.g. dyeing), stonewashing, abrading, and applying surface treatments to garments or textiles used in the production of garments. A textile treatment machine may have a capacity permitting no more than 15 Kg, or 25 Kg, or 50 Kg, or 100 Kg, or 500 Kg of dry textiles to be treated at any given time. The drum volume of a textile treatment machine may be up to 100 L, 500 L, 1000 L or 5000 L.

The textile treatment machine may be a washing machine, which may be a domestic washing machine or a commercial washing machine. A domestic washing machine may have a capacity permitting no more than 15 Kg of dry textiles to be washed at any given time. Typically, a domestic washing machine is either a front loading machine or a top loading washing machine. In a front loading washing machine or a top loading washing machine, the front face is the face comprising the door. Thus, in a top loading washing machine, the front face is the top face. Often domestic washing machines are about 60 cm wide, 60 cm deep and about 85 cm tall. The drum of a domestic washing machine preferably has a capacity of at least 1 litre and more preferably at least 10 litres and preferably no more than 150 litres, or no more than 120 litres.

A commercial washing machine may have a capacity greater than 15 Kg of dry textiles to be washed at any given time. The drum of the textile treatment apparatus may have a capacity of more than 120 litres, more than 150 litres more than 200 litres, more than 400 litres, more than 900 litres or more than 1400 litres. Drums of such larger dimensions are especially suitable for commercial or industrial applications. The drum may have any upper limit to its capacity, preferably the drum has a capacity of no more than 20,000 litres or no more than 10,000 litres.

The textile treatment apparatus may also comprise a drive unit. The drive unit is operable to rotate the drum of the textile treatment apparatus. The drive unit for rotating the drum may be a motor and preferably an electric motor.

The liquid in the treatment formulation may be as described for the feed liquid above. The liquid may comprise one or more treatment additives selected from dyes, pigments, surfactants, enzymes, acids, bases, buffering agents, oxidizing agents, builders, biocides, and anti-staining agents.

The textile treatment apparatus is preferably electrically connected to the filter unit according to the first aspect or third aspect. The textile treatment apparatus may comprise a controller unit which is preferably connected to the filter unit according to the first aspect or third aspect.

A controller in the textile treatment apparatus may comprise a memory loaded with a programme which when operated by a processor operates the drive means connected to or comprised as part of the filter unit. Similarly, one or more valves may be operated by the controller. The operated valves may be valves associated with the inlet, the outlet, the secondary drain outlet, or the air bleed outlet (i.e. the air bleed valve). In this way, operation of the filter unit may be under the direct control of the textile treatment apparatus.

Alternatively, or additionally, the filter unit may comprise a controller. The controller in the filter unit may sense or be sent information relating to the actions of the controller in the textile treatment apparatus and the controller of the filter unit has a memory loaded with a programme which when operated by a processor controls the drive means connected to or comprised as part of the filter unit and/or valves associated with the filter unit. In this way the filter unit is not under the direct control of the textile treatment apparatus but instead it "has knowledge" of what the textile treatment apparatus is doing and can respond accordingly. As an example, the controller in the filter unit may sense that the waste valve in the textile treatment apparatus has been opened and/or that a waste pump has been activated and it may then respond by powering the drive means of the filter unit and/or operating air bleed valves so as to begin filtration with the filter unit. The memory of the controller may be comprised as part of the filter unit or may be accessible via wireless communication.

The filter unit and/or textile treatment apparatus may comprise sensors (for example, pressure or liquid sensors in the drain outlet of the textile treatment apparatus or in the filter chamber and/or sensors to determine the volume of effluent passed to the filter unit). The controller of the filter unit or the textile treatment apparatus may be configured to automatically operate the filter unit based on an input from such sensors. Alternatively, or in addition to, the controller of the filter unit or the textile treatment apparatus may be configured to operate the filter unit after a condition pertaining to a wash cycle is identified (e.g. completion of a wash cycle).

The textile treatment apparatus may comprise: a tub in which the drum is rotatably mounted, the drum having side walls and said side walls comprising one or more apertures configured to permit said treatment formulation to exit the drum; a collector is located beneath said drum and optionally in or underneath the tub, the collector configured to collect said treatment formulation that exits the drum; a filter unit as disclosed herein; and a first flow pathway between the collector and the inlet of the filter unit.

The outlet of the filter unit may be fluidly connected to the drum. In this way, liquid that has passed through the filter unit may be returned to the drum. The outlet of the filter unit may be fluidly connected to a drain. Optionally, the outlet of the filter unit may be fluidly connected to a drain and to the drum. Optionally, the textile treatment apparatus comprises a control valve configured such that liquid filtrate that exits the outlet of the filter unit is selectively recirculated to the drum or sent to a drain.

The textile treatment apparatus may further comprise a recirculation means for recirculating the treatment formulation from said collector to said drum, wherein the filter unit is comprised in the recirculation means. In this way, the filter unit filters treatment formulation during its recirculation from the collector to the drum. Typically, the recirculation means comprises a pump and ducting which connects the collector and the drum.

The textile treatment apparatus may comprise a second filter which is not according to the first aspect or third aspect of the present disclosure or a trap positioned such that treatment formulation passes through the second filter prior to entering the inlet of the filter unit. The second filter or trap may be a coarse filter (e.g. a coin trap) to prevent large pieces or items of solid material from entering the filter, for example, coins, stones, or other items from pockets when washing laundry.

Use

According to a fifth aspect, there is provided a use of the filter unit of the first aspect or third aspect, a filter cage according to the second aspect or the textile treatment apparatus of the fourth aspect for filtering microparticles from a feed liquid.

The use of the textile treatment apparatus according to the fifth aspect may comprise the treatment of textiles. In particular, the textile may comprise the treatment of synthetic contain textiles and/or cellulose containing textiles such as cotton or polycotton. The textile treatment apparatus may be as described under the second aspect.

The use of a filter cage according to the second aspect may comprise inserting the filter cage into a filter chamber to form a filter unit and operating the filter unit to filter microparticles. The filter chamber may be a filter as described herein or otherwise.

The use may be performed according to the method of the sixth aspect.

Method

According to a sixth aspect, there is provided a method of filtering microparticles from a feed liquid containing microparticles, the method comprising:

providing a filter unit according to the first aspect or the third aspect;

supplying the feed liquid containing microparticles through the inlet at the first end wall;

rotating the drive shaft to rotate the filter cage where relative rotation occurs between the first seal surface and the second seal surface;

passing filtered feed liquid out of the outlet; and stopping the rotation of the drive shaft and stopping the supply of feed liquid to the inlet.

The method may comprise dewatering the filtered microparticles by rotating the drive shaft to rotate the filter cage after stopping the supply of feed liquid. The step of dewatering may comprise rotating the drive shaft at a faster rate than during filtration.

Stopping the rotation of the drive shaft and stopping the supply of feed liquid to the inlet may be performed simultaneously or sequentially. Optionally stopping of the supply is performed before stopping rotation of the drive shaft. Stopping the rotation of the drive shaft may be performed by stopping operation of a drive means. Stopping the supply of feed liquid may be performed by stopping operation of a pump or closing a valve upstream of the filter unit.

The method may comprise extracting filtered microparticles from the filter chamber by disconnecting a detachable connection between the first connection surface and second connection surface and removing the filter cage with filtered microparticles contained therein through the opening in the second end wall of the filter chamber; and orientating and agitating the filter cage so that filtered microparticles fall through the opening at the first end of the filter cage.

In some embodiments, disconnecting and removing may comprise a user pulling on the filter cage in the direction of the axis. The user may pull on a handle on the cap of the filter chamber.

In some embodiments, extracting filtered microparticles may comprise removing the filter cage with filtered microparticles contained therein through the opening in the second end wall of the filter chamber; and moving the user operable portion to move the filtration surface cleaning portion relative to the filter cage to detach filtered microparticles from the filtration surface to pass out of the opening at the first end of the filter cage.

Optionally, the feed liquid may be supplied from a textile treatment apparatus. The textile treatment apparatus may optionally be any textile treatment apparatus according to the fourth aspect. Further, the feed liquid may be any feed liquid as described under the first or second aspects. In particular, the textile treatment apparatus of the method may be a washing machine. The filter unit may be contained within a housing of the textile treatment apparatus. The housing may comprise a front face with a detergent drawer located therein, the detergent drawer moveable between an open and a closed configuration, and wherein the filter unit is located behind the detergent drawer.

Optionally, the textile treatment apparatus may be treating one or more cellulose containing garments. Thus, the feed liquid may comprise cellulose microfibres and effluent from the treatment. Typically, the microparticles are or comprise microfibres.

Optionally, extraction may comprise first moving the detergent drawer to an open configuration.

The step of supplying feed liquid containing microparticles through the inlet may comprise first priming the filter chamber by filling the filter chamber with feed liquid. Priming may comprise operating a pump of a treatment machine to pump feed liquid into the filter unit. Priming may comprise operating an air bleed outlet to remove air from the filter chamber. Optionally, after the chamber has been primed the drive shaft may be rotated to begin filtration.

Optionally, after stopping the rotation of the filter cage and stopping supply of feed liquid to the inlet, a valve to a secondary drain outlet may be opened to drain any residual filtered feed liquid from the filter chamber.

Stopping the supply of feed liquid to the inlet may comprise closing a valve upstream of the filter unit or may comprise stopping operation of a pump supplying feed liquid to the inlet.

Stopping rotation of the filter cage may comprise stopping operation of a drive unit.

Dewatering may comprise rotating the filter cage to centrifugally remove water from the microparticles on the one or more filter media. Rotation for dewatering may optionally be performed at a higher G force than rotation during filtration.

The supply of feed liquid to the inlet may be from a single treatment cycle of the textile treatment apparatus. The feed liquid from a single treatment cycle may be delivered in one continuous stream, or the supply of feed liquid from a single treatment cycle may be supplied intermittently.

The method of the sixth aspect may be especially suited to filtering microparticles which are or comprise microfibres. In particular microfibres as defined herein.

The microparticles filtered in the method of the sixth aspect may originate from a textile which has been treated in a liquid medium.

The treatments performed by the textile treatment apparatus may include washing, colouring (especially dyeing and pigmenting), abrading, ageing, softening, rinsing, bleaching, sterilising, desizing and depilling and combinations thereof. The method is especially suited to filtering a feed liquid that is an effluent which originates from a textile treatment apparatus as previously mentioned. Preferably, the textile treatment apparatus is used to rotate (especially tumble) one or more textiles and a liquid medium in a drum. At least some of the fibres in the effluent may comprise synthetic fibres. Examples of synthetic fibres include nylon, polyester, polyurethane, acrylic, acrylonitrile, and the like.

The feed liquid may be at a temperature of from 5 to 95° C., more preferably from 5 to 70° C. and especially from 10 to 60° C. as it passes through the filter unit.

In order of increasing preference, the filter unit according to the first or third aspects or the textile treatment apparatus according to the fourth aspect is able to filter effluent feeds from at least 2, 3, 4, 5, 10, 20, 30, 50 and 100 treatment cycles prior to becoming blocked or requiring cleaning.

In order of increasing preference, the filter unit according to the first or third aspects or the textile treatment apparatus according to the fourth aspect is able to filter feeds whose total volume is at least 10, 50, 100, 500, 1000, 5000 and 10,000 litres prior to becoming blocked or requiring cleaning.

The filter unit may be operated such that the effluent flows through the filter unit once (and only once). This method or operation is relatively fast. The filter unit may alternatively be operated such that the feed of one treatment cycle is cycled through the filter unit one or more times. This method of operation can provide especially good efficiencies of filtration although the filtering times required may be longer. Preferably, the feed is cycled through the filter unit at least 1, 2, 3, 4 and 5 times. Preferably, the feed liquid is cycled through the filter unit no more than 100 times. The number of cycles of filtration of a feed liquid may be calculated as the total volume of liquid passed through the filter unit in a treatment cycle divided by the volume of fresh liquid used in the treatment cycle. For example, if 20 litres of fresh liquid are used in a wash cycle, and 40 litres passes through the filter unit, the filter unit has filtered two cycles.

It will be appreciated that the features, preferences, and embodiments described hereinabove may be applicable where combinations allow, to each of the figures. The aspects of the present disclosure are further described with reference to the following figures.

SUMMARY OF THE FIGURES

FIG. 2b shows a cross sectional side view of the filter unit of FIG. 2a.

FIG. 2c shows an isometric view with a cross section of the filter unit of FIG. 2a.

FIG. 2f shows a cross sectional side view of a filter cage according to the second aspect, with a moveable member and cap, and also of the filter unit of FIG. 2a.

FIG. 2g shows a filter cage, moveable member and cap of FIG. 2f and of the filter unit of FIG. 2a.

FIG. 2h shows a cross sectional side view of a filter cage, moveable member and cap of FIGS. 2f, 2g and of the filter unit of FIG. 2a.

FIG. 2i shows a filter cage of FIGS. 2f to 2h and of the filter unit of FIG. 2a.

FIG. 2k shows the connection member of the filter unit of FIG. 2a.

FIG. 2l shows a filter cage of the filter unit of 2a and of the filter cage of FIGS. 2f to 2h with filter media visible.

DETAILED DESCRIPTION

Figure 1:
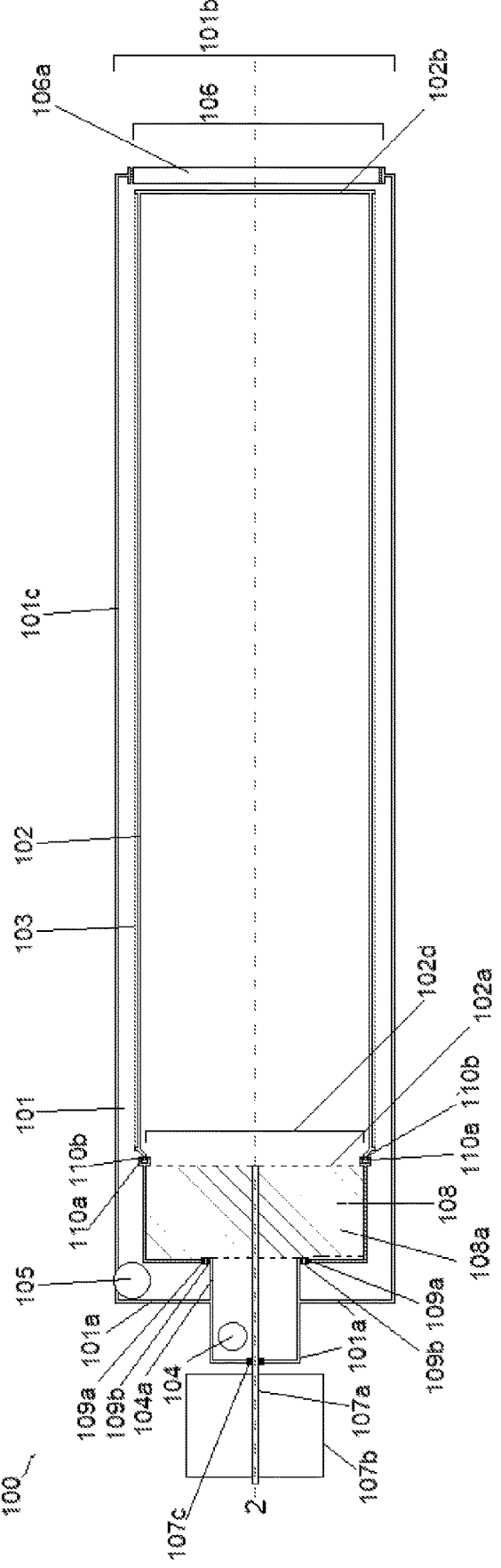
FIG. 1 shows cross sectional schematic side view of a filter unit according to a first aspect of the present disclosure.

With reference to FIG. 1, a filter unit 100 is shown. The filter unit 100 is for filtering microparticles from a feed liquid containing microparticles. The filter unit 100 comprises a filter chamber 101. The filter chamber 101 comprises a hollow structure and it extends along an axis 2. The filter chamber 101 extends along axis 2 and comprises a first end wall 101a and a second end wall 101b which are opposed to each other and are coincident with axis 2. In FIG. 1, a side wall 101c is shown extending between the first and second end walls 101a, 101b. In this embodiment the side wall is a cylindrical wall and in combination with the first and second end walls 101a and 101b, gives the filter chamber 101 the approximate shape of a cylinder. However, the filter chamber may take other forms as described above.

The second end wall 101b comprises an opening 106 and a cap 106a that is removable from the opening. The opening 106 can be closed by the cap 106a so that liquid cannot pass through the opening 106. The cap 106a can be removed from the opening 106 so that filtered microparticles in the filter cage 102 can be extracted from the filter chamber 101 through opening 106. In the embodiment shown in FIG. 1, the cap 106a secures with screw threads into the opening 106 in the second end wall 101b of the filter chamber 101. However other means are also envisioned such as bayonet fixings or securing latches.

A filter cage 102 is shown contained within the filter chamber 101. The filter cage 102 is configured to rotate around the axis 2 when inside the filter chamber 101. The filter cage 102 is a rigid structure comprising a rigid sidewall that supports a porous filter media 103. The filter media 103 filters microparticles from the feed liquid as the feed liquid passes through the filter media 103. In this embodiment, the filter media forms part of the cylindrical wall of the filter cage 102. However, other configurations are also envisioned for example, a rigid mesh can be used as both the filter cage sidewall 102c and the filter media 103. The filter cage 102 has a first end 102a which is proximal to the first end wall 101a of the filter chamber 101 when the filter cage 102 is in the filter chamber 101. The first end 102a of the filter cage 102 comprises an opening 102d. The opening extends for substantially all of the area bounded by the filter cage 102 at the first end 102a. The filter cage 102 comprises a second end 102b which is proximal to the second end wall 101b of the filter chamber 101 when the filter cage 102 is in situ in the filter chamber 101. The filter cage 102 is configured to be removable from the filter chamber 101 by being sized smaller than the opening 106 in the second end wall 101b of the filter chamber 101 so as to be removable through the opening 106.

The filter chamber 101 further comprises an inlet 104 that is configured to pass feed liquid into the filter chamber 101 and ultimately into the filter cage 102 via the opening 102d at the first end 102a of the filter cage 102. In the embodiment of FIG. 1, the inlet 104 is shown supplying feed liquid perpendicular to the axis 2 into the filter chamber 101, the feed liquid is supplied into the opening via the connection member 108. An inlet extension 104a supplies feed liquid into the connection member 108 and prevents the unfiltered feed liquid from mixing with filtered feed liquid in the filter chamber 101. The inlet extension 104a is shown as a continuation of the first end wall 101a and thus part of the filter chamber 101. Other arrangements of the inlet 104 for supply of liquid feed into the filter cage 102 are also envisioned, including but not limited to the inlet being in the first end wall 101a or the sidewall 101c and/or passing feed liquid through a hollow centre of drive shaft 107a, and/or dispensing with the inlet extension 104a.

An outlet 105 is also comprised in the filter chamber 101. The outlet 105 permits filtered feed liquid to exit the filter chamber 101. In the embodiment shown in FIG. 1, the outlet 105 is shown at a top-most portion of the filter chamber 101 and at a tangent to the sidewall 101c. However other configurations of the outlet are also envisioned including but not limited to locating the outlet in the first or second end walls 101a, 101b.

The filter unit 100 comprises a connection member 108. The connection member 108 is positioned inside the filter chamber and comprises a first seal surface 109a configured to cooperate with a second seal surface 109b to provide a rotary seal. The rotary seal permits relative rotation between the first and second seal surfaces 109a, 109b and prevents filtered feed liquid in the connection member 108 mixing with unfiltered feed liquid in the filter chamber 101. During filtration the first seal surface 109a rotates and the second seal surface 109b remains static. The connection member 108 also comprises a first connection surface 110a. The first connection surface 110a is configured to cooperate with a second connection surface 110*b* to provide a detachable connection therebetween. The detachable connection in FIG. 1 operates as a push fit connection, however other connections such as a twist lock connection are also envisioned.

In the embodiment shown in FIG. 1, the second seal surface 109*b* is located on the filter chamber 101, in particular located on the filter extension 104*a* which projects out of the first end wall 101*a* of the filter chamber 101. Thus, the connection member 108 can rotate relative to the filter chamber 101. The second connection surface 110*b* is located on the filter cage 102, in particular the first end 102*a* of the filter cage 102. Other arrangements are also envisioned, in a non-limiting example, the second seal surface 109*b* may be on the filter cage 102 and the second connection surface 110*b* may be on the filter chamber 101, in particular, on the first end wall 101*a*, inlet extension 104*a* or sidewall 101*c* of the filter chamber.

The filter unit 100 also comprises a drive shaft 107*a*. The drive shaft 107*a* extends through the first end wall 101*a* to the filter cage 102. In the embodiment shown in FIG. 1, the drive shaft 107*a* extends through a sealed bearing 107*c*. The drive shaft 107*a* is arranged to drive rotation of the filter cage 102 so that rotation of the drive shaft 107*a* drives rotation of the filter cage 102. Drive may be transferred via a direct connection to the filter cage 102 (not shown in FIG. 1) or via the connection member 108. In the embodiment shown in FIG. 1 the drive is transferred via the connection member 108 to the filter cage 102. In embodiments comprising a direct connection to the filter cage, the connection may be a non-permanent disconnectable shaft connection to enable the filter cage to detach from the drive shaft (not shown in FIG. 1).

The drive shaft 107*a* is shown in FIG. 1 connected to the connection member 108 by radial members 108*a* shown with hatched lines which connect from the drive shaft 107*a* to the connection member 108, the radial members are circumferentially spaced with spacings in between which permit flow of feed liquid through the connection member 108 from the inlet 104 into the filter chamber 101.

In use, the cap 106*a* is in the opening 106 forming a sealed filter chamber 101. Feed liquid is supplied into the filter chamber 101 via the inlet 104. Feed liquid passes into the connection member 108 and enters the filter cage 102 via the opening 102*d*. The drive shaft 107*a* is rotated by the motor 107*b* so that the filter cage 102 rotates. Centrifugal force from rotation of the filter cage 102 drives liquid through the filter media 103 and out of the filter chamber 101 via outlet 105. Supply of feed liquid is stopped, and residual filtered feed liquid allowed to drain from the filter chamber, via outlet 105. The filtered microparticles accumulated on the filter media 103 may be dewatered by further rotation of the filter cage 102 to throw residual liquid from the filtered microparticles. After dewatering, rotation of the filter cage 102 is stopped. The cap 106*a* is removed from the opening 106. The filter cage 102 is then removed by disconnecting the detachable connection formed by the first and second connection surfaces 110*a*, 110*b*. Disconnecting is by pulling the filter cage 102 in a direction parallel to the axis 2 and away from the connection member 108 to separate the first and second connection surfaces 110*a*, 110*b*. The filter cage 102, and thus the filtered microparticles retained on the filter media 103 are then withdrawn through the opening 106.

The filtered microparticles can then be removed from the filter cage 102 by orientating the filter cage 102 with the second end 102*b* above the first end 102*a* and agitating the filter cage 102 by shaking or tapping against a rigid surface, so that filtered microparticles fall through the opening 102*d* at the first end 102*a* of the filter cage 102.

Figure 2A:
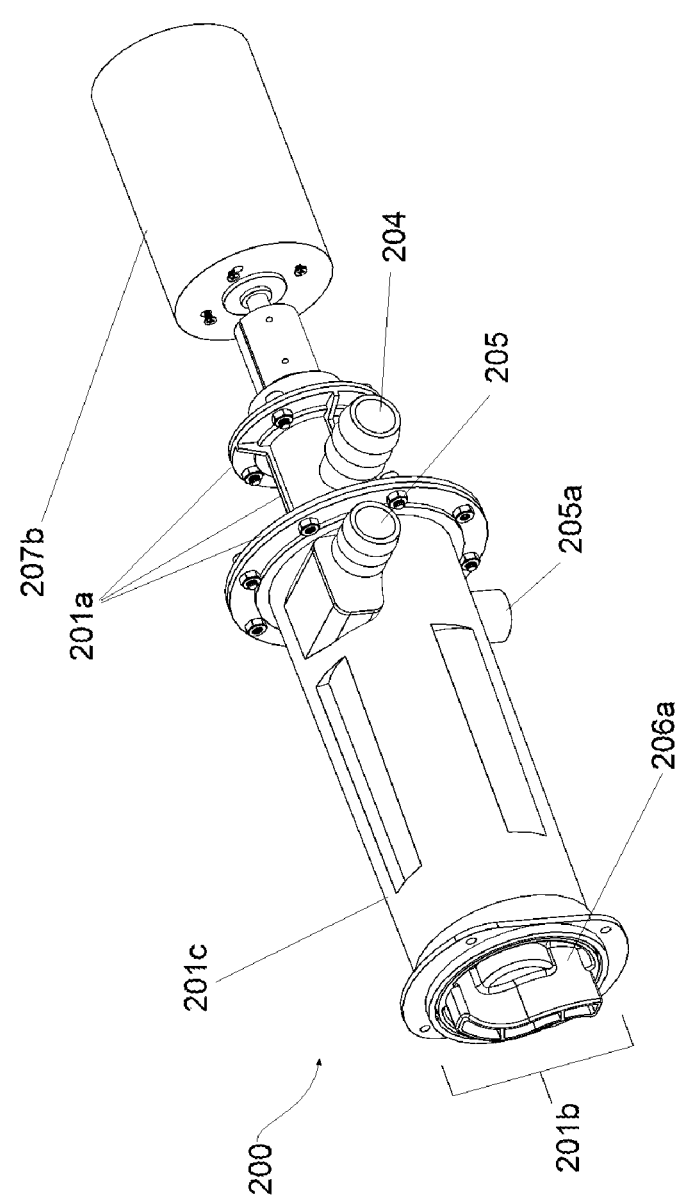
FIG. 2a shown an isometric view of an alternative filter unit according to the first aspect the present disclosure.
Figure 2B:
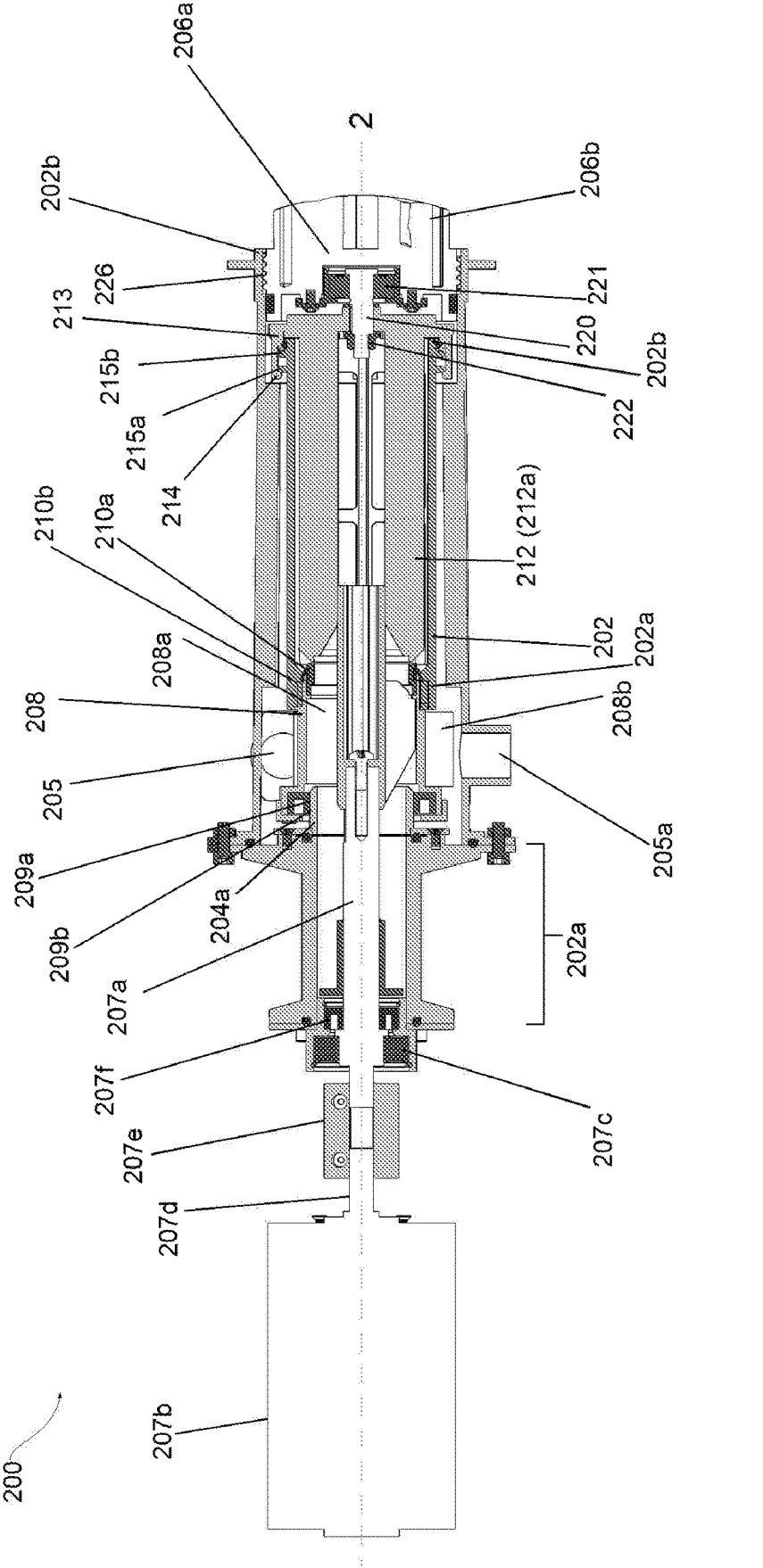
Figure 2C:
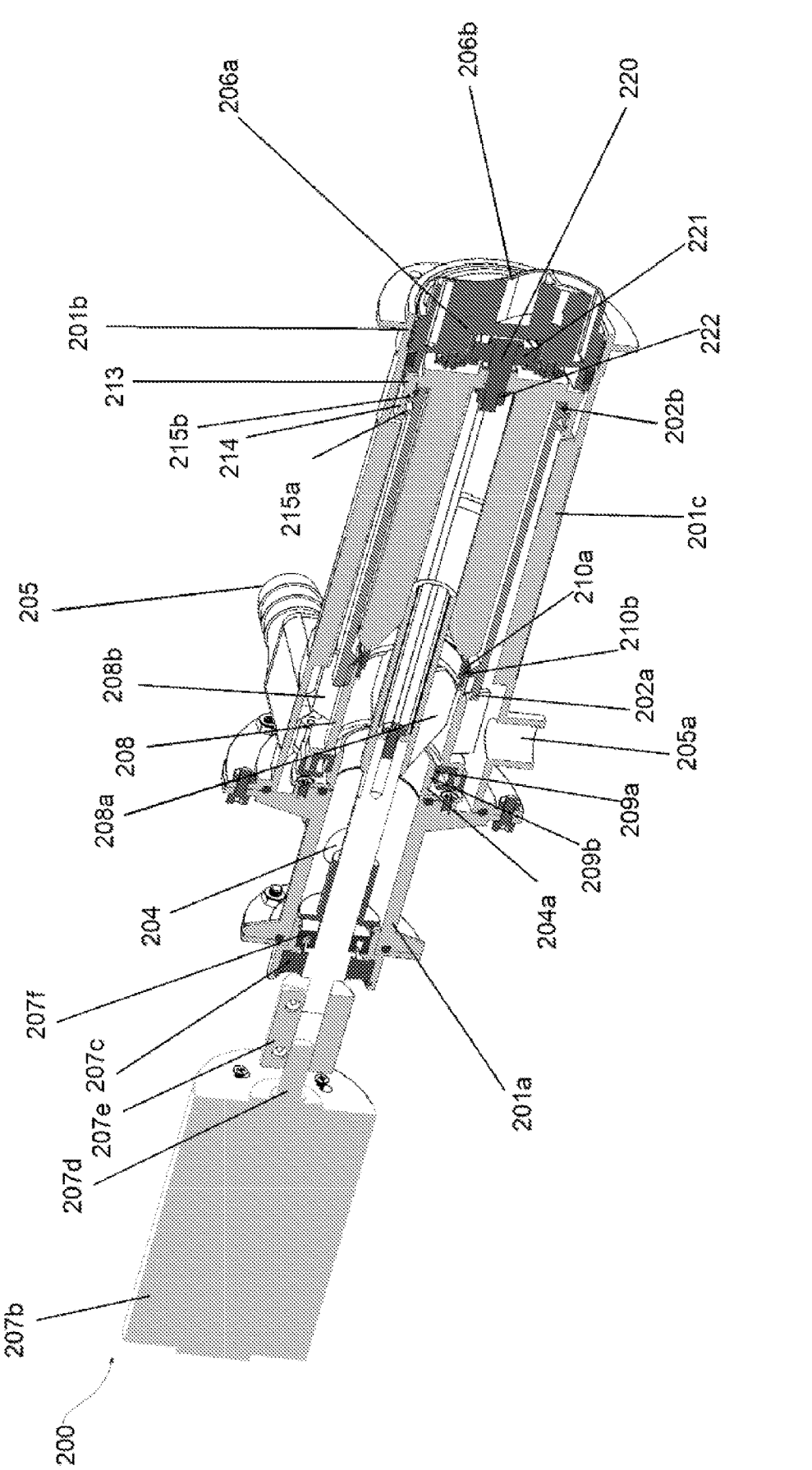
Figure 2D:
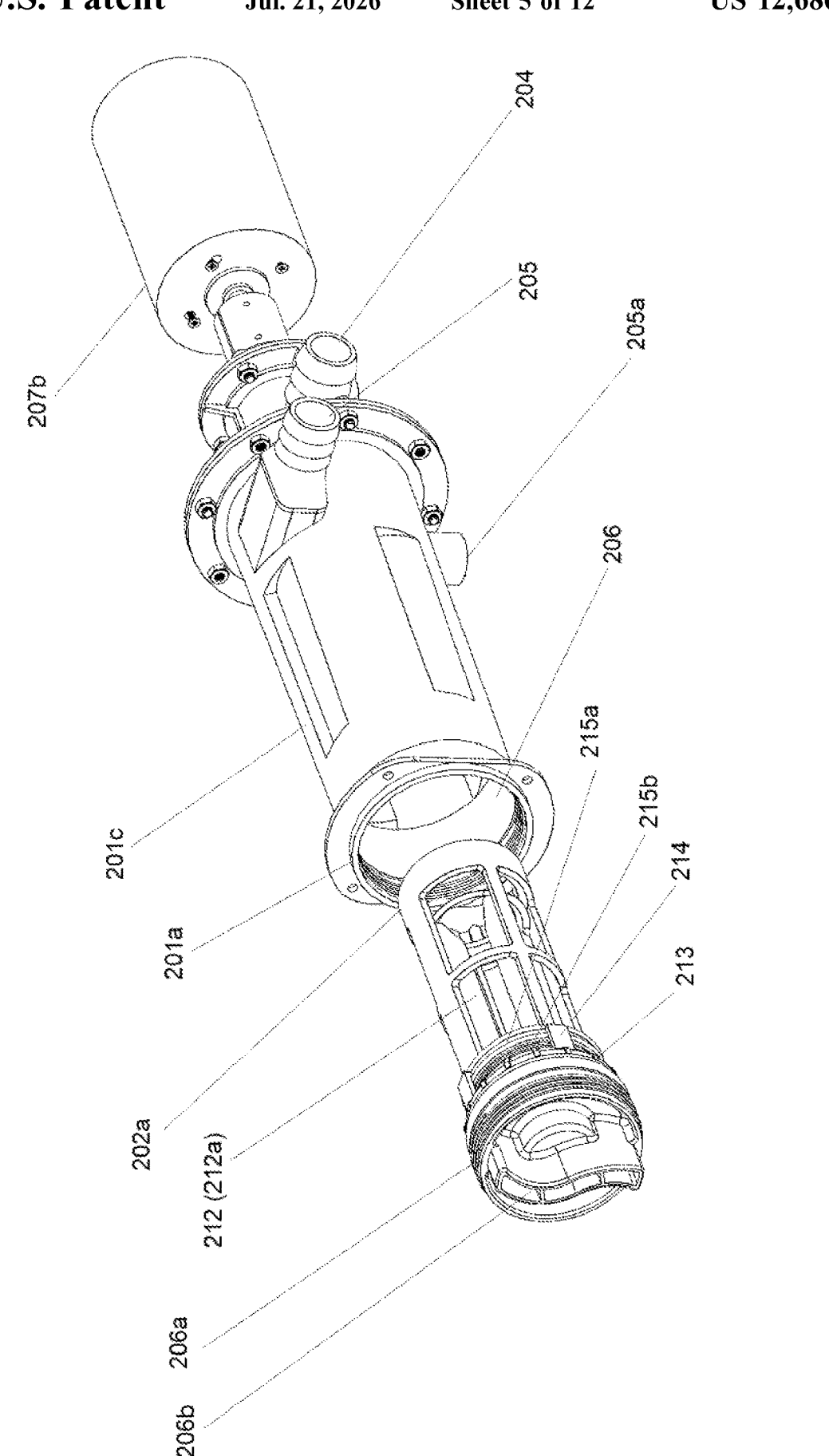
FIG. 2d shows in an isometric view of the filter unit of FIG. 2a with, the cap, moveable member and a filter cage according to the second aspect of the present disclosure removed from the filter chamber.
Figure 2E:
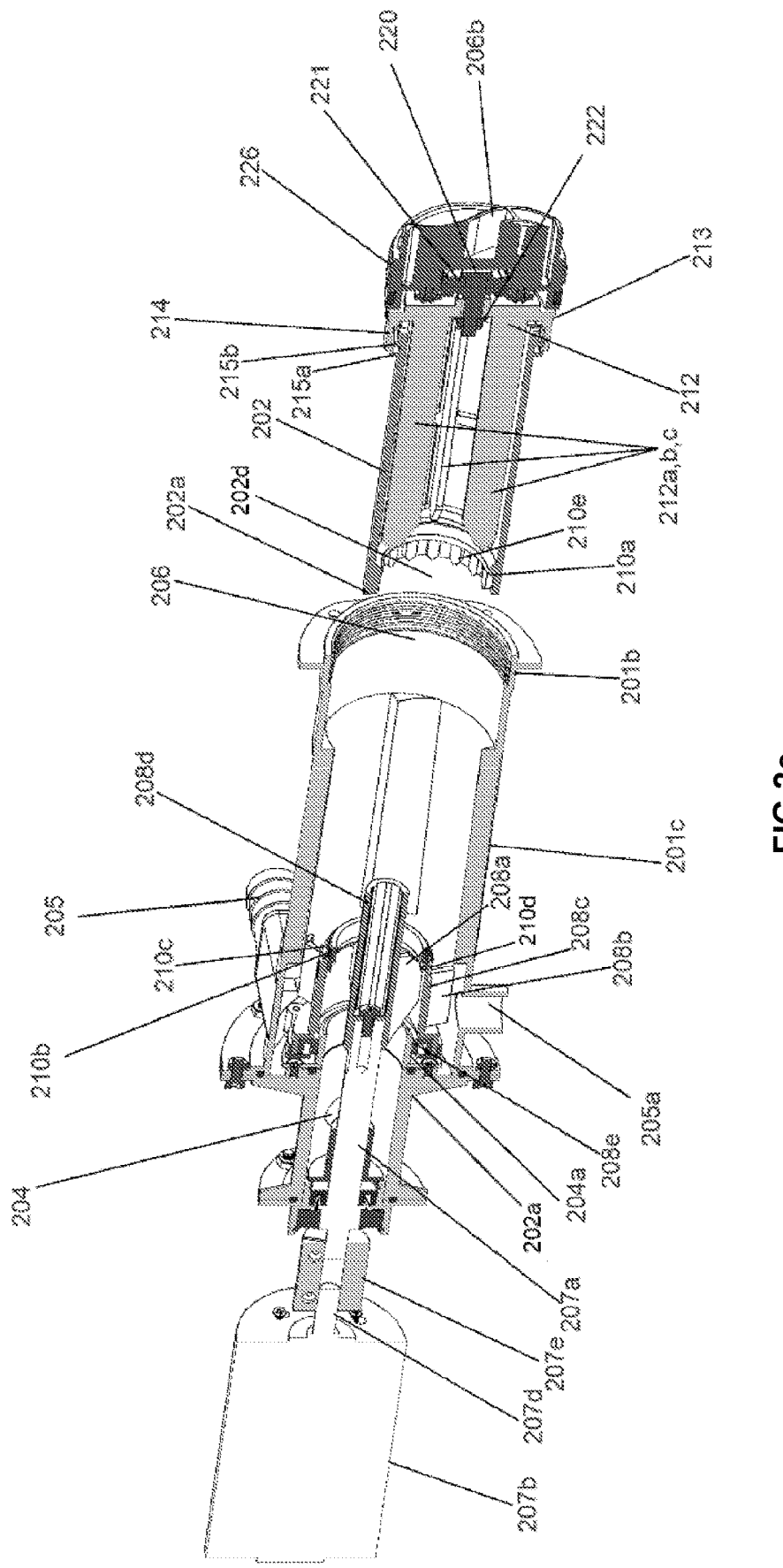
FIG. 2e shows an isometric view with a cross section of FIG. 2d.

With reference to FIGS. 2*a* to 2*e* an alternative filter unit 200 is shown that is in accordance with the first aspect. The filter unit 200 is for filtering microparticles from a feed liquid containing microparticles. Referring to FIG. 2*a*, the filter unit 200 is shown assembled and in an isometric view. In FIG. 2*b*, the filter unit is shown assembled and as a cross sectional side view through the centre of the filter unit 200. In FIG. 2*c*, the filter unit 200 is shown in an isometric view of the same cross section as shown FIG. 2*b*. In FIG. 2*d*, the filter unit 200 is shown in an isometric view with the filter cage, cap and moveable member removed from the filter chamber. In FIG. 2*e*, the filter unit 200 is shown in an isometric view with cross section through the centre of filter unit with the filter cage, cap and moveable member removed from the filter chamber.

Figure 2F:
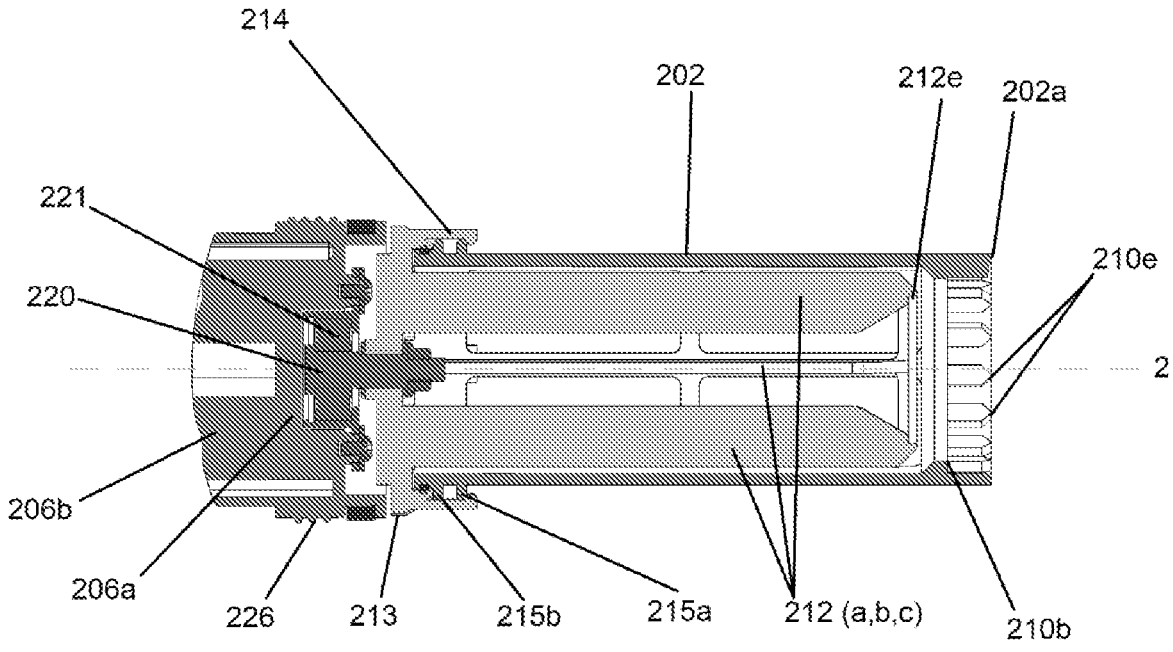
Figure 2G:
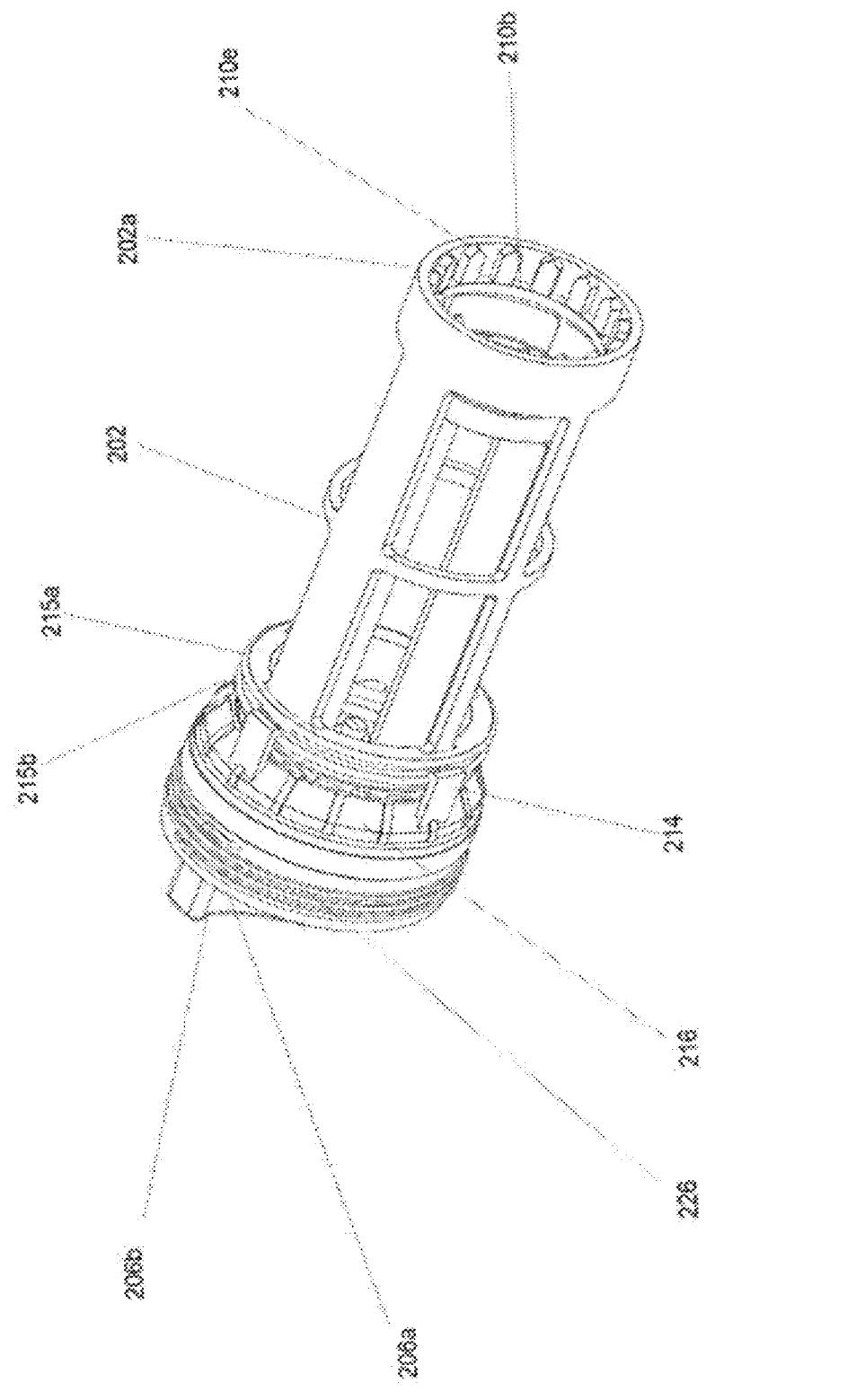
Figure 2H:
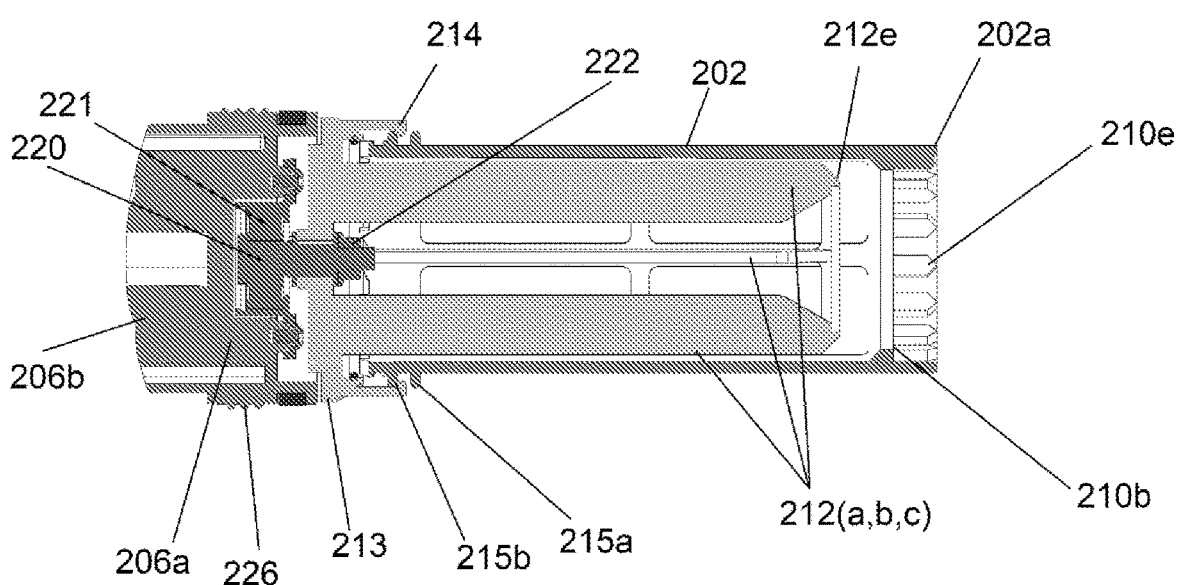
Figure 2I:
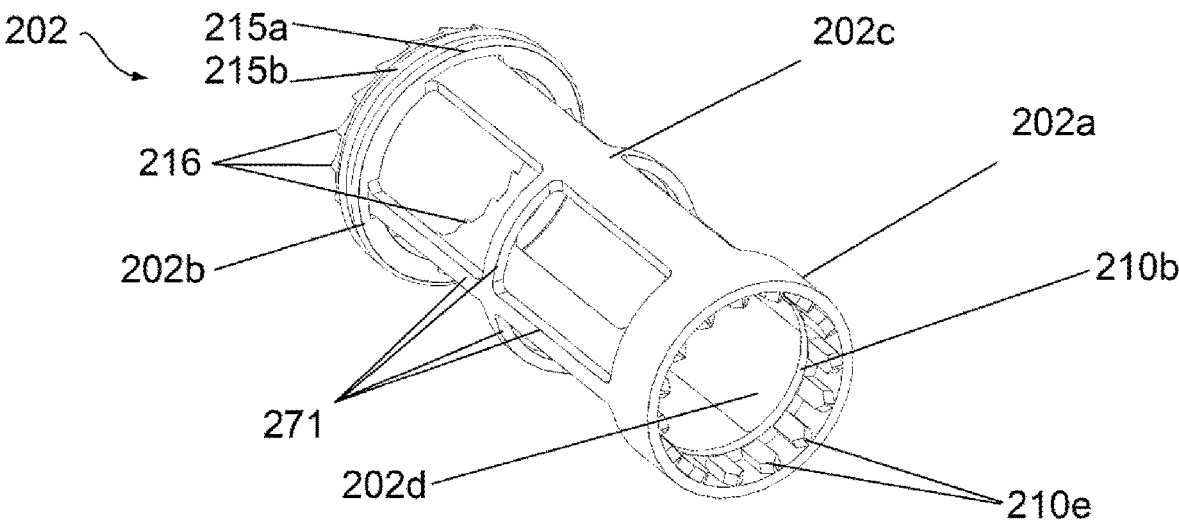
Figure 2J:
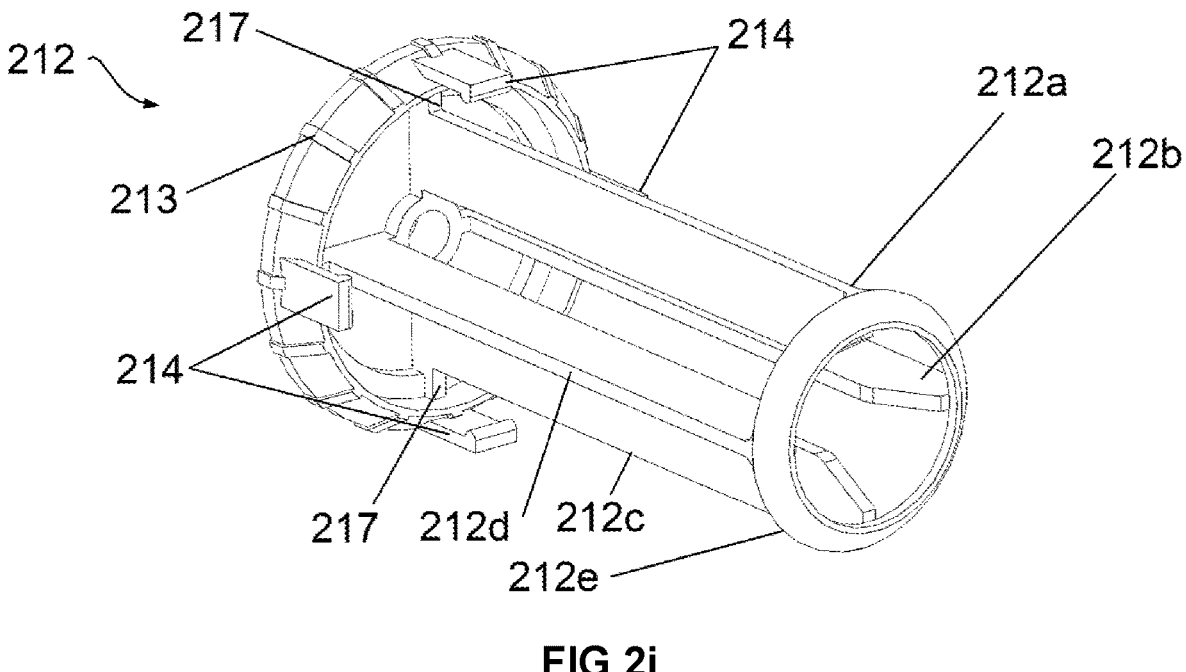
FIG. 2j shows the moveable member of the filter unit of FIG. 2a and of the filter cage of FIGS. 2f to 2h.
Figure 2K:
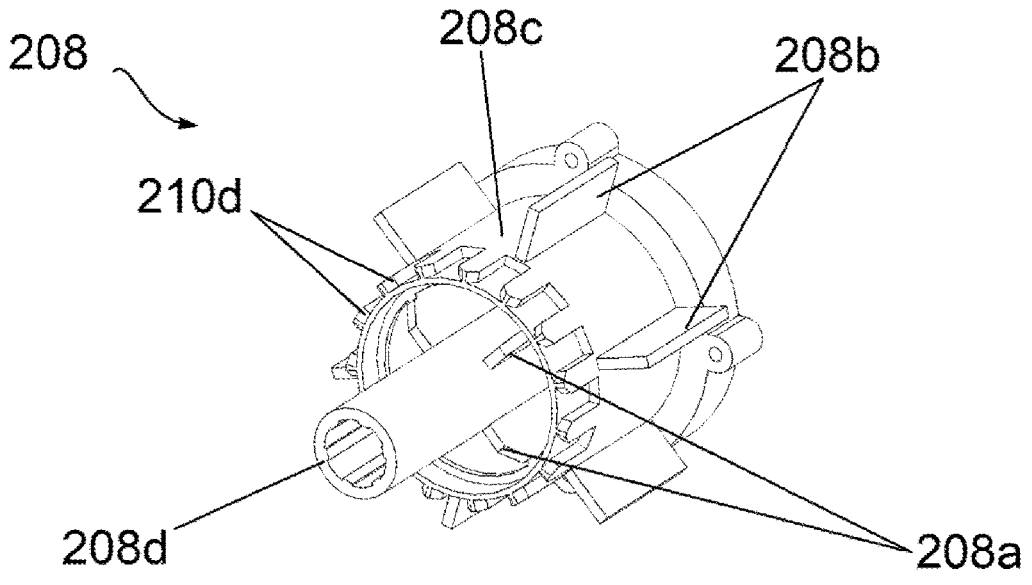
Figure 2I:
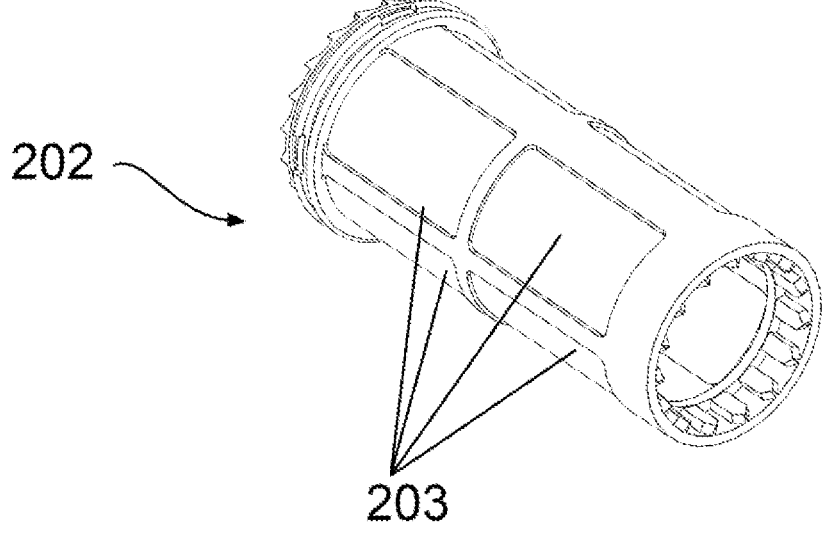

With reference to FIG. 2*f* a filter cage, moveable member and cap of the filter unit are shown in detail in a first configuration as a cross sectional side view the filer cage is also in accordance with the second aspect. In FIG. 2*g* the filter cage, moveable member and cap of FIG. 2*f* are shown in a second configuration in an isometric view. In FIG. 2*h* the filter cage, moveable member and cap of FIG. 2*g* are shown in a second configuration as a cross sectional side view. In FIG. 2*i* the filter cage is shown in an isometric view. In FIG. 2*j* the moveable member is shown in an isometric view. In FIG. 2*k* the connection member is shown in an isometric view.

The filter unit 200 comprises a filter chamber 201 which approximates to a hollow cylinder. The filter chamber 201 comprises a first end wall 201*a* and a second end wall 201*b* (illustrated in FIG. 2*b*) which are opposed to each other and coincident with axis 2 passing through the centre of the filter chamber 201. A cylindrical side wall 201*c* of the filter chamber 201 extends between the first and second end walls. The first end wall 201*a* is shown comprising a closed second cylinder of smaller diameter abutting the cylindrical side wall 201*c*.

The inlet 204 permits entry of feed liquid into the filter chamber 201 in the region of the first end wall 201*c*. The inlet 204 is an opening in the first end wall 201*a* of the filter chamber 201. In FIG. 2*b* the inlet 204 is occluded from view by the drive shaft 207*a*. Feed liquid entering the filter chamber 201 passes through the inlet 204 into the smaller cylinder at the first end wall 201*a* of the filter chamber 201 and is ultimately directed into a filter cage 202.

An outlet 205 is comprised in the cylindrical side wall 201*c* of the filter chamber 201 in an elevated position at a vertically uppermost part of the chamber. The outlet 205 permits filtered feed liquid to exit the filter chamber 201. With the outlet 205 in an elevated position, air bubbles in the feed liquid can exit from the filter chamber 201. However, this means a residual volume of liquid may be retained in the filter chamber 201 beneath the level of the outlet 205. The filter unit 200 also comprises a secondary drain outlet 205*a* in a bottom portion of the cylindrical side wall 201*c* to drain any residual liquid from the filter chamber 201. The secondary drain outlet may also comprise a valve (not shown) operable to drain residual liquid.

The second end wall 201*b* is comprised entirely of an opening 206 and a cap 206*a*. The cap 206*a* and the opening 206 occupy all of the second end wall 201*b* of the filter unit 200. The cap 206*a* is secured in the second end wall 201*b* of the filter chamber 201 via screw threads 226. When the cap 206*a* is removed from the filter chamber 201, the opening 206 in the second end wall 201b is sufficiently large to extract the filter cage 202 therethrough.

In FIGS. 2b and 2c the filter cage 202 is shown located within the filter chamber 201. In FIGS. 2d and 2e the filter cage 202 is shown removed from the filter chamber 201. The filter cage 202 is also shown in detail in FIGS. 2f to 2j and 2h. The filter cage comprises a first end 202a, which when the cage is in situ in the filter chamber 201, is located adjacent to the first end wall 201a of the filter chamber 201. The filter cage 202 also comprises a second end 202b, which when the cage is in situ in the filter chamber 201, is located adjacent to the second end wall 201b of the filter chamber 201. The filter cage 202 also comprises a sidewall 202c extending between the first end 202a and opposing second end 202b and extending parallel to axis 2. The sidewall 202c of the filter cage 202 comprises a rigid lattice structure 271 and porous filter media 203 secured to the internal surface of the lattice structure 271. The lattice structure 271 of the filter cage 202 approximates to a cylinder, when the porous filter media 203 are secured to the lattice 271. The porous filter media 203 are shown in FIG. 2l and are omitted from the other figures for visibility. The porous filter media 203 filter microparticles from the feed liquid as the feed liquid passes through the filter media 203. The porous filter media 203 may comprise a mesh, a perforated sheet, woven or non-woven fibre sheet, cloth or felt, or other porous material. The filtered microparticles accumulate on a first surface of the filter media 203 which is the internal surface of the filter media 203 facing axis 2.

The first end 202a of the filter cage comprises an opening 202d that spans the first end 202a. Feed liquid from the inlet 204 enters the filter cage 202 when in situ in the filter chamber 201 through the opening 202d and exits the filter cage via the filter media 203. When the filter cage 202 is removed from the filter chamber 201, filtered microparticles can be extracted from the interior of the filter cage 202 through the opening 202d.

The filter unit 200 also comprises a connection member 208 located within the filter chamber 201 and proximal to the first end wall 201a. The connection member 208 comprises an annular body 208c through which feed liquid is supplied into the opening 202d of the filter cage 202 from the inlet 204. The connection member 208 also comprises a central spindle 208d coincident with axis 2. The central spindle 208d is connected to the annular body 208c by internal impellor blades 208a. The exterior of the annular body 208c comprises external impellor blades 208b. The central spindle 208d is connected to the drive shaft 207a. When the drive shaft 207a rotates the connection member 208 also rotates, rotating the internal and external impellor blades 208a, 208b and annular body 208c. Feed liquid from the inlet 204 that passes into the interior of the annular body 208c is rotated by internal impellor blades 208a. Filtered feed liquid that has passed out of the filter cage 202 via filter media 203 is driven out of the filter chamber 201 at the outlet 205 by rotation of external impellor blades 208b.

The connection member 208 also comprises a first seal surface 209a and a first connection surface 210a. Both the first seal surface 209a and the first connection surface 210a are located on the annular body 208c of the connection member 208. The first connection surface 210a is located at the end of the connection member 208 that is adjacent to the first end 202a of the filter cage 202 when the filter cage is in the filter chamber 201. The first seal surface 209a on an annular seal member that is the surface facing the inlet extension 204a. The annular seal member being connected to the connection member 208 at the end of the connection member 208 that is adjacent to the first end wall 201a of the filter chamber 201.

A second connection surface 210b is located on the first end 202a of the filter cage 202. The first and second connection surfaces 210a, 210b are configured to cooperate by being sized and shaped correspondingly so that the two connections surfaces 210a, 210b cooperate by forming a detachable connection. The detachable connection may include but not be limited to a push fit connection or a twist lock connection for example. In FIGS. 2a to 2l, the embodiment shown is a push fit connection whereby the filter cage 202 is pushed towards the connection member 208 to secure the second connection surface 210b around the first connection surface 210a. Pulling on the filter cage 202 in the reverse connection disconnects the detachable connection between the first and second connection surfaces 210a, 210b. Either of the first and second connection surfaces 210a, 210b may comprise any of compliant seals or interlocking structures. In the embodiment shown in FIGS. 2a to 2l, the first connection surface 210a comprises a rubber O-ring seal 210c and teeth 210d. The first end 202a of the filter cage 202 also comprises corresponding teeth 210e that interlock with teeth 210d.

The embodiment shown in FIGS. 2a to 2l has a first end wall 201a comprising a second closed cylinder. This portion of the first end wall extends into the main cylinder of the filter chamber 201 as an inlet extension 204a. The inlet extension 204a channels feed liquid from inlet 204 to the connection member 208 preventing the unfiltered feed liquid from mixing with filtered feed liquid in the filter chamber 201. The second seal surface 209b is located on the inlet extension 204a part of the filter chamber 201. The second seal surface 209b and the first seal surface 209a are configured to cooperate to provide a rotary seal that permits the second seal surface 209b and the first seal surface 209a to rotate relative to each other. For example, the second seal surface 209b and the first seal surface 209a may comprise one static and one rotary surface of a bushing, alternatively, each surface may comprise a race in a rotary element bearing. In the embodiment shown in FIGS. 2a to 2l the first seal surface 209a is an annular seal member connected to the annular body 208c of the connection member 208. The annular seal member is retained against the connection member 208 by seal retention member 208e. The annular seal member rotates with the connection member 208 and contacts the second seal surface 209b which is static. The second seal surface is a smooth plastic surface on inlet extension 204a. Together the first seal surface 209a and the second seal surface 209b form a rotary lip seal where relative rotation of the two surfaces is permitted and egress of liquid between the unfiltered feed liquid in the connection member 208 and the filtered feed liquid in the filter chamber 201 is prevented.

The drive shaft 207a is driven by a drive means. The drive means shown in FIGS. 2a to 2e is an electric motor 207b. The rotor 207d of the motor 207b is coupled to the drive shaft 207a via coupling 207e. The drive shaft 207a passes through the first end wall 201a in which is it rotatably mounted by roller element bearing 207c. A seal 207f prevents feed liquid from exiting the filter chamber 201 via bearing 207c. The drive shaft 207a is connected to the central spindle 208d via a screw so that torque from motor 207b is transferred via the drive shaft and the connection member 208 to the filter cage 202. In the embodiment shown in FIGS. 2a to 2l the motor is coupled to the drive shaft in a linear axial arrangement, however other arrangements are also envisioned including but not limited to the drive means rotor 207d being integrally formed with the drive shaft 207a or para-axial arrangements where drive is transferred via a belt systems or gears.

The filter cage 202 of FIGS. 2a to 2l further comprises a moveable member 212 located in the interior of the filter cage 202. The moveable member 212 comprises four blades 212a, 212b, 212c, 212d. Each of the blades 212a, 212b, 212c, 212d are linear and parallel to the axis 2. The blades 212a, 212b, 212c, 212d each comprise a filtration surface cleaning portion which when in situ in the filter cage 202 are close to or in contact with the filtration surface of the filter media 203. The surface cleaning portion is the surface of the blades 212a, 212b, 212c, 212d that is radially outermost from axis 2. The moveable member 212 also comprises a secondary filtration surface cleaning portion in the form of an annular scraper blade 212e located adjacent to the first end 202a of the filter cage 202 when the moveable member is in situ in the filter cage 202.

The filter cage 202 of FIGS. 2a to 2l further comprises a user operable portion 213 on the exterior of the filter cage 202 that is adapted to be operated by a user's hand when the filter cage 202 has been removed from the filter chamber 201. The user operable portion 213 is sized to be grasped by a hand and comprises a textured surface. The user operable portion 213 is located at the second end 202b of the filter cage 202. When the filter cage is removed from the filter, the user can grasp the filter cage 202 with one hand and rotate the user operable portion 213 about axis 2 with their other hand.

The user operable portion 213 is integrally formed and thus directly connected to the moveable member 212, so any rotation of the user operable portion 213 causes the moveable member 212 to rotate. Rotation of the moveable member 212 moves the surface cleaning portion of the blades 212a, 212b, 212c, 212d against the filtration surface of the filter media 203. This loosens filtered microparticles on the filtration surface so that the microparticles can fall out of the opening 206 at the first end 202a of the filter cage 202 when the second end 202b of the filter cage 202 is held above the opening 206. This allows the user to empty the filter cage 202 of microparticles with the ease of operating a "pepper-mill", and without having to access or even see the interior of the filter cage 202. This also means that emptying does not necessarily involve the removal or disassembly of components which requires reassembly of these components after emptying.

The user operable portion 213 is connected to the filter cage 202 via four circumferentially spaced latches 214. The sidewall 202c of the filter cage 202 comprises an annular first engagement member 215a and an adjacent annular second engagement member 215b, both located near the second end 202b of the filter cage 202. The first engagement member 215a is located closer to the first end 202a than the second engagement member 215b. The latches 214 are configured to engage with both engagement members 215a, 215b. When the latches 214 are engaged with the first engagement member 215a, the user operable portion is in a first configuration and teeth 216 on the second end 202b of the filter cage 202 engage with ribs 217 on a corresponding surface of the moveable member 212. In this position the teeth prevent relative rotation between the moveable member 212 and the filter cage 202. This means that when the filter cage 202 is in the filter chamber 201, the filter cage 202 can be rotated via driveshaft 207a and the moveable member 212 rotates with the filter cage 202. The blades 212a, 212b, 212c, 212d of the moveable member 212 are configured by being sized and shaped to function as an impellor. For example they comprise faces angled into the direction of rotation around axis 2 and project radially inwards. This means that when rotated they will push a substantial volume of water around the filter cage 202 and thus, they function as an impellor in the filter cage 202. In the first configuration, the moveable member 212 also prevents escape of unfiltered feed liquid between the movable member 212 and the filter cage 202.

When the latches 214 are engaged with the second engagement member 215b, the moveable member is in a second configuration and the teeth 216 are not engaged with ribs 217 on the corresponding surface of the moveable member 212. In this position the moveable member is free to rotate relative to the filter cage 202 so that a user can rotate the moveable member 212 via the user operable portion 213 to empty the filter cage 202. Thus, the filter cage 202 is configured so that the one more blades 212a, 212b, 212c, 212d can rotate with the filter cage 202 when the filter cage 202 is rotating but can also rotate relative to the filter cage 202 when rotated by the user operable portion 213.

The latches 214 can also be disengaged from both of the engagement members 215a, 215b. This means that the moveable member 212 can be removed from the filter cage 202 in its entirety by withdrawing the moveable member 212 from the second end of the filter cage 202.

The movable member 212 comprises a secondary filtration surface cleaning portion 212e which is proximal to or contacting the filtration surface when the movable member is in the filter cage 202 and is configured to remove filtered microparticles from the filtration surface when the movable member 212 is removed from the filter cage 202. The secondary filtration surface cleaning portion 212e is an annular member which contacts the filtration surface of the filter media 203 adjacent to the first end 202a of the filter cage 202 when in situ in the filter cage 202. When the moveable member 212 is withdrawn from the filter cage 202, the secondary filtration surface cleaning portion 212e is scraped across the filtration surface from the first end 202a to the second end 202b cleaning the filter media 203. Thus the filter cage 202 is provided with two cleaning mechanisms which clean the filtration surface in different directions.

In the embodiment shown in FIGS. 2a to 2l, the cap 206a is connected to the moveable member 212 via spindle 220. The spindle 220 is rotatably mounted to the cap 206a via a cap bearing 221. The spindle 220 is also connected to the moveable member 212 by a nut 222. This arrangement provides a rotatable connection between the second end of the filter cage 202b and cap 206a. This allows the cap 206a to rotate relative to the moveable member 212 and filter cage 202, so that the cap 206a can be screwed or unscrewed in the filter chamber 201 without rotating the filter cage 202 or moveable member 212. This arrangement connects the cap 206a to the moveable member 212, so that the filter cage 202 can be pulled out of the filter chamber 201 and placed into the filter chamber via the cap 206a. This arrangement also supports the second end 202b of the filter cage 202 during rotation in the filter chamber 201. The cap 206a comprises a handle 206b to facilitate removal of the filter cage 202.

In use, the moveable member 212 is inside the filter cage 202 and in the first configuration with latches 214 engaged with the first engagement member 215a. The filter cage 202 is in the filter chamber 201 and the first connection surface 210a on the connection member 208 is engaged with the first connection surface 210b of the filter cage 202. The cap 206a is in opening 106 of the filter chamber 201. In this configuration the filter unit 200 is sealed, and liquid can only enter and leave the filter chamber 201 via the inlet 204, the outlet 205 or the secondary drain outlet 205a.

Feed liquid is supplied to the inlet 204 which in turn flows through the inlet extension 204a, through the annular body of the connection member and into the filter cage 202 via opening 102d. The feed liquid enters the filter cage 202 where it can only exit via the filter media 203 on the filter cage 202. The motor 207b is operated to drive rotation of the drive shaft 207a. Rotation of the drive shaft 207a is transferred to the connection member 208 which in turn drives rotation of the filter cage 202 via the first and second connection surfaces 210a, 210b and teeth 210d and 210e. Rotation of the filter cage 202 is also transferred to the moveable member 212 via teeth 216 on the filter cage 202 and ribs 217 on the moveable member 212. The blades of the moveable member 212 act as impellors and cause the feed liquid to rotate inside the filter cage 202 inducing centrifugal forces and establishing a pressure gradient and causing feed liquid to flow through out of the filter cage 202 via the filtration media 203. The filtration media filters microparticles from the feed liquid which are retained inside the filter cage 202. Feed liquid in the connection member 208 is also rotated by the internal impellor blades 208a further establishing a pressure gradient. The pressure gradient drives filtered feed liquid out of the filter chamber 201 via the outlet 205 and assisted by the external impellor blades 208b of the connection member 208. At the end of filtration, supply of the feed liquid is stopped. Any filtered feed liquid retained in the filter chamber 201 may be drained out of the secondary drain outlet 205b. Optionally the filter cage 202 may be rotated by the motor 207b to dewater the filtered microparticles by utilising centrifugal force to throw residual liquid from the filtered microparticles.

Once the motor 207b has stopped operating, the opening 206 can be opened by removing cap 206a. A user can then pull on the handle 206b of the cap 206a to disconnect the first connection surface 210a from the second connection surface 210b and withdraw the filter cage 202 from the filter chamber 201. The user can empty microparticles by orientating the second end 202b of the filter cage 202 above the opening 202d of the filter cage 202 so that filtered microparticles can fall out of the opening 202d and preferentially into a waste bin. If filtered microparticles remain on the filtration surface of the filter media 203, then the user can move the movable member 212 into the second configuration where the latches 214 engage with the second engagement member 215b. The user can then rotate the moveable member 212 via the user operable portion 213 so that the surface cleaning portion of the blades 212a, 212b, 212c, 212d rotates against the filtration surface of the filter media 203 to dislodge any filtered microparticles. The dislodged microparticles will then fall out of the opening 202d of the filter cage 202 and preferentially into the waste bin. Infrequently the user may wish to access the interior of the filter cage 202, e.g. for inspection, maintenance or for further cleaning. In this case, the user can also disengage the latches 214 from the engagement members 215a, 215b and remove the moveable member from the filter cage. This will further remove microparticles via the secondary filtration surface cleaning portion 212e as it is scraped against the filtration surface of the filter media 203.

Figure 3:
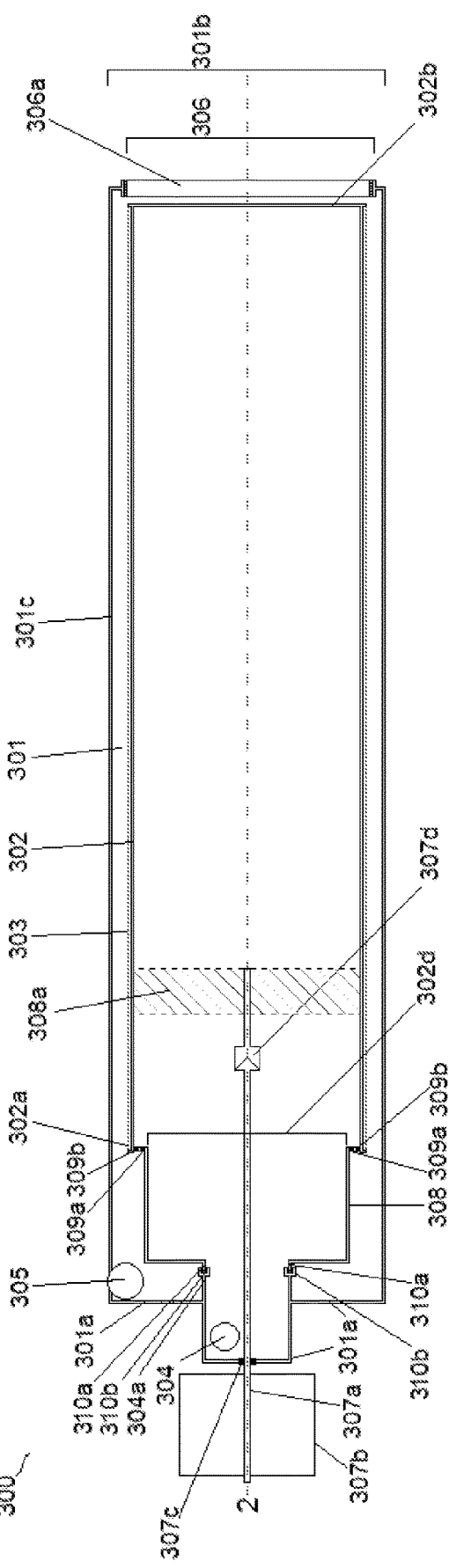
FIG. 3 shows a cross sectional schematic of an alternative filter unit according to the present disclosure.

Referring to FIG. 3 an alternative filter unit 300 is shown. The filter unit 300 is for filtering microparticles from a feed liquid containing microparticles. The filter unit 300 comprises substantially the same integers as the filter unit 100 shown in FIG. 1 which function in substantially the same manner as that described under FIG. 1. The filter unit 300 comprises a filter chamber 301 which extends along an axis 2, and comprises a first end wall 301a, a second end wall 301b and a side wall 301c extending between the first and second end walls 301a, 301b. The second end wall 301b comprises an opening 306 and a cap 306a. The second end wall 301b of the filter chamber 301 comprises an opening 306. The opening 306 can be closed by cap 306a so that liquid cannot pass through the opening 306. The cap 306a can be removed from the opening 306 into so that filtered microparticles on filter cage 302 can be extracted from the filter chamber 301 through opening 306.

A filter cage 302 is shown contained within the filter chamber 301. The filter cage 302 is configured to rotate around the axis 2 when in the filter chamber 301. The filter cage 302 is a rigid structure that supports a porous filter media 303. The filter cage 302 has a first end 302a which is proximal to the first end wall 301a of the filter chamber 301 when the filter cage 302 is in the filter chamber 301. The first end 302a of the filter cage 302 comprises an opening 302d. The filter cage 302 comprises a second end 302b which is proximal to the second end wall 301b of the filter chamber 301 when the filter cage 302 is in situ in the filter chamber 301.

The filter chamber 301 further comprises an inlet 304 that is configured to pass feed liquid into the filter chamber 301 and the filter cage 302 via the opening 302c at the first end 302a. An inlet extension 304a supplies feed liquid into a connection member 308. The inlet extension 304a is shown as a continuation of the first end wall 301a and thus part of the filter chamber 301. An outlet 305 is also comprised in the filter chamber 301. The outlet 305 permits filtered feed liquid to exit the filter chamber 301.

The connection member 308 is positioned inside the filter chamber 301 and comprises a first seal surface 309a configured to cooperate with a second seal surface 309b to provide a rotary seal. The rotary seal permitting relative rotation between the first and second seal surfaces 309a, 309b and providing a seal preventing mixing of filtered and unfiltered feed liquid. The connection member 308 also comprises a first connection surface 310a. The first connection surface 310a is configured to cooperate with a second connection surface 310b to provide a detachable connection therebetween.

The embodiment shown in FIG. 3 differs from the embodiment shown in FIG. 1 in that the second rotary surface 309b is on the filter cage 302 and the second connection surface 310b is on the filter chamber 301 in particular on the filter extension 304a which projects out of the first end wall 301a of the filter chamber 301. The second connection surface 310b is located on the filter cage 302, in particular the first end 302a of the filter cage 302.

The filter unit 300 also comprises a drive shaft 307a. The drive shaft 307a extends through the first end wall 301a and sealed bearing 307c and connects to the filter cage 302 via a non-permanent disconnectable shaft connection 307d. Rotation of the drive shaft via motor 307b drives rotation of the filter cage 302. The connection member 308 remains static. The drive shaft 307a is shown in FIG. 1 connected to the filter cage 302 by radial members 308a shown in grey which connect from the drive shaft 307a to the filter cage 302 but have openings therebetween to permit flow of feed liquid through the connection member 308 from the inlet 304 towards the second end 302b of the filter cage 302.

In use, the cap 306a is in the opening 306 forming sealing filter chamber 301. Feed liquid is supplied into the filter chamber 301 via the inlet 304. Feed liquid passes into the connection member 308 and enters the filter cage 302 via the opening 302*d*. The drive shaft 307*a* is rotated by motor 307*b* so that the filter cage 302 rotates. Centrifugal force from rotation of the filter cage drives liquid through the filter media 303 and out of the filter chamber 301 via outlet 305. Supply of feed liquid is stopped, and residual filtered feed liquid allowed to drain from the filter chamber 301, via outlet 305. The filtered microparticles accumulated on the filter media 303 may be dewatered by further rotation of the filter cage 302 to throw residual liquid from the filtered microparticles. After dewatering, rotation of the filter cage 302 is stopped. The cap 306*a* is removed from the opening 306. The filter cage 302 is then removed by disconnecting the detachable connection formed by the first and second connection surfaces 310*a*, 310*b*. Disconnecting is by pulling the filter cage 302 in a direction parallel to the axis 2 and away from the first end 301*a* of the filter chamber 301 to separate the first and second connection surfaces 310*a*, 310*b*. The filter cage 302 and also the connection member 308, and thus the filtered microparticles retained on the filter media 303 are then withdrawn through the opening 306.

Filtered microparticles can then be removed from the filter cage 302 by holding the filter cage 302 with the second end 302*b* above the first end 302*a* and agitating the filter cage 302 by shaking or tapping against a rigid surface so that filtered microparticles fall through the opening 302*c* at the first end 302*a* of the filter cage 302 and through the connection member 308 and out of the filter cage 302.

As used herein, the term "comprising" encompasses "including" as well as "consisting" and "consisting essentially of" e.g. a composition "comprising" X may consist exclusively of X or may include something additional e.g. X+Y. As used herein, the words "a" or "an" are not limited to the singular but are understood to include a plurality, unless the context requires otherwise. Thus, words such as "an item" also mean "one or more items". It will be appreciated that any item, feature, parameter or component described herein may, where appropriate, relate to any of the aspects of the present invention.

Clause Set 1

1. A filter unit for filtering microparticles from a feed liquid containing microparticles, the filter unit comprising:
    a filter chamber extending along an axis, and comprising opposing first end and second end walls and at least one sidewall extending between the first end and second end walls, wherein both first end and second end walls are coincident with the axis, and wherein the second end wall is or comprises an opening therein and a cap removable from the opening;
    a filter cage contained within the filter chamber and configured to rotate about the axis, the filter cage comprising:
        a first end proximal to the first end wall of the filter chamber when the filter cage is in the filter chamber wherein the first end of the filter cage comprises an opening;
        a second end proximal to the second end wall of the filter chamber when the filter cage is in the filter chamber;
        a filter cage sidewall between the first end and the second end, wherein the filter cage sidewall is or comprises one or more than one filter media for filtering microparticles from the feed liquid; and wherein the filter cage is removable from the filter chamber through the opening in the second end wall of the filter chamber;
    wherein the filter chamber further comprises:
    an inlet configured to pass feed liquid into the filter chamber to supply feed liquid into the filter cage via the opening at the first end of the filter cage when the filter is in the filter chamber; and
    an outlet for passage of filtered liquid out of the filter chamber;
    the filter unit further comprises:
    a connection member comprising a first seal surface and a first connection surface; and
    a drive shaft configured to drive rotation of the filter cage;
    wherein the first seal surface is configured to cooperate with a second seal surface to provide a rotary seal permitting relative rotation therebetween and the first connection surface is configured to cooperate with a second connection surface to provide a detachable connection therebetween;
    wherein the second seal surface is on the filter chamber and the second connection surface is on the filter cage or wherein the second seal surface is on the filter cage and the second connection surface is on the filter chamber.

2. A filter unit according to clause 1 wherein the second seal surface is on the filter chamber and the second connection surface is on the filter cage, and the connection member is not removable from the filter chamber.

3. A filter unit according to clause 1 wherein the second seal surface is on the filter cage and the second connection surface is on the filter chamber, and the connection member is removable from the filter chamber with the filter cage.

4. A filter unit according to clause 3, wherein the drive shaft is configured to drive rotation of the filter cage directly and wherein the drive shaft comprises a disconnectable shaft connection between the drive shaft and the filter cage.

5. A filter unit according to clause 2, wherein the drive shaft is configured to drive rotation of the filter cage via the connection member.

6. A filter unit according to any preceding clause wherein the second end of the filter cage comprises a rotatable connection to the cap.

7. A filter unit according to any preceding clause wherein the second end of the filter cage comprises a detachable cap.

8. A filter unit according to any preceding clause wherein the first end of the filter cage comprises an opening that is at least 60%, or at least 75%, or at least 95% of the area bounded by the filter cage sidewall at the opening at the first end of the filter cage measured perpendicular to the axis.

9. A filter unit according to any preceding clause wherein the first end of the filter cage comprises an opening where an edge of the opening is coincident with the filter cage sidewall.

10. A filter unit according to any preceding clause wherein the filter cage sidewall defines an interior and an exterior of the filter cage and the filter cage comprises one or more impellor blades on the interior and/or exterior of the filter cage.

11. A filter unit according to any preceding clause wherein the connection member comprises an opening to pass feed liquid from the inlet into the opening at the first end of the filter cage.

12. A filter unit according to any preceding clause wherein the connection member comprises impellor blades.

13. A filter unit according to any previous clause wherein the filter cage sidewall defines an interior and exterior of the filter cage and the filter cage comprises:

a moveable member in the interior the filter cage comprising a filtration surface cleaning portion which is proximal to the filtration surface; and a user operable portion adapted to be operated by hand on the exterior of the filter cage;

and wherein the moveable member is connected to the user operable portion so that movement of the user operable portion causes movement of the filtration surface cleaning portion relative to the filter cage to detach filtered microparticles from the filtration surface to pass out of the opening.

14. A filter unit according to clause 13, wherein the user operable portion is configured to be moved by rotating around the axis.

15. A filter unit according to clause 13 or clause 14, wherein movement of the user operable portion causes rotation of the filtration surface cleaning portion around the axis.

16. A filter unit according to any of clause 13 to 15, wherein the moveable member is removable from the interior filter cage.

17. A filter unit according to clause 16, wherein the movable member comprises a secondary filtration surface cleaning portion which is proximal to the filtration surface and is configured to remove filtered microparticles from the filtration surface when the movable member is removed from the filter cage.

18. A filter unit according to any of clause 13 to 17, wherein the moveable member is connected to the user operable portion by being integrally formed, by a mechanical connection or by a magnetic connection.

19. A filter unit according to any of clause 13 to 18, wherein the user operable portion is proximal to the second end of the filter cage.

20. A filter unit according to any of clause 13 to 19, wherein the moveable member comprises one or more blades which extend along the length of the filter cage sidewall.

21. A filter unit according to clause 20, wherein the one or more blades are linear and extend parallel to the axis.

22. A filter unit according to clause 20 or clause 21, wherein the filter cage is configured so that the one more blades rotate with the filter cage when the filter cage is rotating to function as an impellor, but rotate relative to the filter cage when rotated via the user operable portion.

23. A filter unit according to clause 22, wherein the user operable portion is configurable between a first configuration where the user operable portion is not moveable relative to the filter cage, and a second configuration where the user operable portion is moveable relative to the filter cage.

24. A filter unit according to clause 23, wherein one of the user operable portion and the filter cage comprise one or more latches to engage with one or two or more than two engagement members on the other of the user operable portion and the filter cage.

25. A filter unit according to any of clause 22 to clause 23, wherein the one or more blades are sized and orientated to function as an impellor when the filter cage is rotating.

26. A textile treatment apparatus comprising a housing comprising a front face accessible by a user and a door therein;

a filter unit according to any preceding clause located within the housing;

a drum contained within the housing, the drum comprising an interior volume and an open end aligned with the door of the front face of the housing.

27. A textile treatment apparatus according to clause 26 wherein the filter unit is configured so that the filter cage is removable from the filter chamber via the opening of the filter chamber through the front face of the housing.

28. A textile treatment apparatus according to clause 26 or 27, wherein the textile treatment apparatus comprises a detergent drawer located in the front face of the housing, the detergent drawer moveable between a closed configuration and an open configuration, and wherein the filter unit is located behind the detergent drawer and wherein the opening and cap at the second end wall of the filter chamber are accessible by a user through the detergent drawer when the detergent drawer is in an open configuration.

29. A textile treatment apparatus according to any of clause 26 to 28, wherein the textile treatment apparatus is a washing machine.

30. A textile treatment apparatus according to any of clause 26 to 29, wherein the feed liquid is from the textile treatment apparatus.

31. A textile treatment apparatus according to any of clause 26 to 30, wherein the outlet of the filter unit is connected to a drain of the textile treatment apparatus.

32. The use of a filter unit or a textile treatment apparatus according to any previous clause for filtering microparticles from a feed liquid.

33. A method of filtering microparticles from a feed liquid containing microparticles, the method comprising:

providing a filter unit according to any of clause 1 to 25;

supplying the feed liquid containing microparticles through the inlet at the first end wall;

rotating the drive shaft to rotate the filter cage where relative rotation occurs between the first seal surface and the second seal surface;

passing filtered feed liquid out of the outlet; and stopping the rotating of the drive shaft and stopping supply of feed liquid to the inlet.

34. A method of filtering microparticles according to clause 33, comprising dewatering the filtered microparticles by rotating the drive shaft to rotate the filter cage after stopping the supply of feed liquid.

35. A method of filtering microparticles according to any of clause 33 or 34, further comprising extracting filtered microparticles from the filter chamber by:

disconnecting the detachable connection between the first connection surface and second connection surface and removing the filter cage with filtered microparticles contained therein through the opening in the second end wall of the filter chamber; and orientating and agitating the filter cage so that filtered microparticles fall through the opening at the first end of the filter cage.

36. A method of filtering microparticles according to clause 35, wherein disconnecting and removing comprises a user pulling on the filter cage in the direction of the axis.

37. A method of filtering microparticles according to any of clause 33 to 36, wherein the feed liquid is supplied from a textile treatment apparatus.

38. A method of filtering microparticles according to any of clause 33 to 37, wherein the textile treatment apparatus is a washing machine.

39. A method of filtering microparticles according to clause 37 or 38, wherein the textile treatment apparatus is treating one or more cellulose containing garments.

40. A method of filtering microparticles according to any of clause 37 to 39, wherein the filter unit is contained within a housing of the textile treatment apparatus.

41. A method of filtering microparticles according to any of clause 33 to 40, wherein the microparticles are or comprise microfibres.

Clause Set 2

1. A filter cage for use in a filter unit for filtering microparticles from a feed liquid containing microparticles, wherein the filter cage extends along an axis and is configured to be rotatable within the filter unit about the axis and removable from the filter unit;

the filter cage comprising:

at least one filter cage sidewall extending parallel to the axis, the at least one filter cage sidewall comprising a first end and an opposing second end, the filter cage sidewall defining an interior and exterior of the filter cage, wherein the filter cage sidewall is or comprises one or more than one filter media for filtering microparticles from a feed liquid, the filter media defining a filtration surface on the interior of the filter cage where filtered microparticles accumulate during filtering;

a moveable member in the interior the filter cage comprising a filtration surface cleaning portion which is proximal to the filtration surface;

a user operable portion adapted to be operated by hand on the exterior of the filter cage;

wherein the first end of the filter cage is or comprises an opening for extraction of filtered microparticles from the filter cage when the filter cage is removed from the filter unit and for supply of feed liquid into the filter cage when the filter cage is inside the filter unit;

and wherein the moveable member is connected to the user operable portion so that movement of the user operable portion causes movement of the filtration surface cleaning portion relative to the filter cage to detach filtered microparticles from the filtration surface to pass out of the opening at the first end of the filter cage.

2. A filter cage according to clause 1, wherein the user operable portion is configured to be moved by rotating around the axis.

3. A filter cage according to clause 1 or clause 2, wherein the moveable member is removable from the interior of the filter cage.

4. A filter cage according to clause 3, wherein the movable member comprises a secondary filtration surface cleaning portion which is proximal to the filtration surface and is configured to remove filtered microparticles from the filtration surface when the movable member is removed from the filter cage.

5. A filter cage according to any preceding clause, wherein the moveable member is connected to the user operable portion by being integrally formed, by additional mechanical components or by a magnetic connection.

6. A filter cage according to any preceding clause, wherein the user operable portion is proximal to second end of the filter cage.

7. A filter cage according to any preceding clause, wherein the moveable member comprises one or more blades which extend along the length of the filter cage sidewall.

8. A filter cage according to clause 7, wherein the one or more blades are linear and extend parallel to the axis.

9. A filter cage according to clause 7 or clause 8, wherein the filter cage is configured so that the one more blades rotate with the filter cage when the filter cage is rotating, but rotate relative to the filter cage when rotated by the user operable portion.

10. A filter cage according to clause 9 wherein the one or more blades are configured to function as an impellor when the filter cage is rotating.

11. A filter cage according to clause 9 or clause 10, wherein the user operable portion is configurable between a first configuration where the user operable portion cannot move relative to the filter cage, and a second configuration where the user operable portion can move relative to the filter cage.

12. A filter cage according to clause 11, wherein one of the user operable portion and the filter cage comprise one or more latches to engage with one or two or more than two engagement members on the other of the user operable portion and the filter cage.

13. A filter cage according to any preceding clause wherein the opening in the first end of the filter cage comprises an opening that is at least 60%, or at least 75% or at least 95% of the area bounded by the filter cage filter cage sidewall at the opening at the first end of the filter cage sidewall of the filter cage measured perpendicular to the axis.

14. A filter cage according to any preceding clause wherein the first end of the filter cage comprises an opening where an edge of the opening is coincident with the filter cage sidewall.

15. A filter cage according to any preceding clause wherein filtered microparticles can be removed from the filter cage without removing any apparatus from the filter cage.

16. A filter cage according to any preceding clause wherein filtered microparticles can be removed from the filter cage without opening the second end of the filter cage.

17. A filter unit comprising:

a filter chamber extending along the axis, and comprising opposing first end and second end walls and at least one sidewall extending between the first end and second end walls, wherein both first end and second end walls are coincident with the axis, and wherein the second end wall is or comprises an opening therein and a cap removable from the opening;

a filter cage according to any of clauses 1 to 16, contained within the filter chamber and configured to rotate about the axis, wherein the filter cage is removable from the filter chamber through the opening in the second end wall; and wherein the filter chamber further comprises an inlet configured to pass feed liquid into the filter chamber to supply feed liquid into the filter cage via the opening at the first end of the filter cage when the filter is in the filter chamber; and an outlet for passage of filtered liquid out of the filter chamber.

18. A filter unit according to clause 17 wherein the filter unit further comprises:

a connection member comprising a first seal surface and a first connection surface; and a drive shaft configured to drive rotation of the filter cage;

wherein the first seal surface is configured to cooperate with a second seal surface to provide a rotary seal permitting relative rotation therebetween and the first connection surface is configured to cooperate with the second connection surface to provide a detachable connection therebetween;

wherein the second seal surface is on the filter chamber and the second connection surface is on the filter cage or wherein the second seal surface is on the filter cage and the second connection surface is on the filter chamber.

19. A filter unit according to clause 18 wherein the second seal surface is on the filter chamber and the second connection surface is on the filter cage, and the connection member is not removable from the filter chamber and the drive shaft is configured to drive rotation of the filter cage via the connection member.

20. A filter unit according to clause 19 wherein the second seal surface is on the filter cage and the second connection surface is on the filter chamber, and the connection member is removable from the filter chamber with the filter cage.

21. A filter unit according to clause 20, wherein the drive shaft is configured to drive rotation of the filter cage directly and wherein the drive shaft comprises a disconnectable shaft connection between the drive shaft and the filter cage.

22. A filter unit according to any of clauses 18 to 21, wherein the second end of the filter cage comprises a rotatable connection to the cap.

23. A filter unit according to any of clauses 18 to 22, wherein the connection member comprises an opening to pass feed liquid from the inlet into the opening at the first end of the filter cage.

24. A filter unit according to any of clauses 18 to 23, wherein the connection member comprises impellor blades.

25. A textile treatment apparatus comprising
a housing comprising a front face accessible by a user and a door therein;
a filter unit according to any of clauses 18 to 24, located within the housing;
a drum contained within the housing, the drum comprising an interior volume and an open end aligned with the door of the front face of the housing.

26. A textile treatment apparatus according to clause 25 wherein the filter unit is configured so that the filter cage is removable through the front face of the housing.

27. A textile treatment apparatus according to clause 25 or 26, wherein the textile treatment apparatus comprises a detergent drawer located in the front face of the housing, the detergent drawer moveable between a closed configuration and an open configuration, and wherein the filter unit is located behind the detergent drawer; and wherein the opening and the cap at the second end wall of the filter chamber are accessible by a user through the detergent drawer when the detergent drawer is in an open configuration.

28. A textile treatment apparatus according to any of clauses 25 to 27, wherein the textile treatment apparatus is a washing machine.

29. A textile treatment apparatus according to any of clauses 25 to 28, wherein the feed liquid is from the textile treatment apparatus.

30. A textile treatment apparatus according to any of clauses 25 to 29, wherein the outlet of the filter unit is connected to a drain of the textile treatment apparatus.

31. The use of a filter cage, a filter unit, or a textile treatment apparatus according to any previous clause for filtering microparticles from a feed liquid.

32. A method of filtering microparticles from a feed liquid containing microparticles, the method comprising:
providing a filter unit according to any of clauses 17 to 24;
supplying the feed liquid containing microparticles through the inlet at the first end wall;
rotating the drive shaft to rotate the filter cage where relative rotation occurs between the first seal surface and the second seal surface;
passing filtered feed liquid out of the outlet; and stopping the rotation of the drive shaft and stopping supply of feed liquid to the inlet.

33. A method of filtering microparticles according to clause 32, comprising dewatering the filtered microparticles by rotating the drive shaft to rotate the filter cage after stopping the supply of feed liquid.

34. A method of filtering microparticles according to any of clauses 32 or 33, further comprising extracting filtered microparticles from the filter chamber by:
removing the filter cage with filtered microparticles contained therein through the opening in the second end wall of the filter chamber; and
moving the user operable portion to move the filtration surface cleaning portion relative to the filter cage to detach filtered microparticles from the filtration surface to pass out of the opening at the first end of the filter cage.

35. A method of filtering microparticles according to clause 34 when dependent on clause 18, wherein removing the filter cage comprises disconnecting the detachable connection between the first connection surface and second connection surface and removing the filter cage with filtered microparticles contained therein through the opening in the second end wall of the filter chamber.

36. A method of filtering microparticles according to clause 35, wherein disconnecting comprises a user pulling on the filter cage in the direction of the axis.

37. A method of filtering microparticles according to any of clauses 32 to 36, wherein the feed liquid is supplied from a textile treatment apparatus.

38. A method of filtering microparticles according to any of clause 32 to 37, wherein the textile treatment apparatus is a washing machine.

39. A method of filtering microparticles according to clause 37 or 38, wherein the textile treatment apparatus is treating one or more cellulose containing garments.

40. A method of filtering microparticles according to any of clauses 37 to 39, wherein the filter unit is contained within a housing of the textile treatment apparatus.

41. A method of filtering microparticles according to clause 40, wherein the housing comprises a front face with a detergent drawer located therein, the detergent drawer moveable between an open and a closed configuration, and wherein the filter unit is located behind the detergent drawer and wherein extraction comprises first moving the detergent drawer to an open configuration.

42. A method of filtering microparticles according to any of clauses 32 to 41, wherein the microparticles are or comprise microfibres.

The invention claimed is:

1. A filter cage for use in a filter unit for filtering microparticles from a feed liquid containing microparticles, wherein the filter cage extends along an axis and is configured to be rotatable within the filter unit about the axis and removable from the filter unit;
the filter cage comprising:
at least one filter cage sidewall extending parallel to the axis, the at least one filter cage sidewall comprising a first end and an opposing second end, the filter cage sidewall together with the first and second end defining an interior and exterior of the filter cage, wherein the filter cage sidewall is or comprises one or more than one filter media for filtering microparticles from a feed liquid, the filter media defining a filtration surface on the interior of the filter cage where filtered microparticles accumulate during filtering;

a moveable member in the interior the filter cage comprising a filtration surface cleaning portion which is proximal to the filtration surface;

a user operable portion, at the second end, adapted to be operated by hand on the exterior of the filter cage;

wherein the first end of the filter cage is or comprises an opening for extraction of filtered microparticles from the filter cage when the filter cage is removed from the filter unit and for supply of feed liquid into the filter cage when the filter cage is inside the filter unit;

and wherein the moveable member is connected to the user operable portion so that movement of the user operable portion causes movement of the filtration surface cleaning portion relative to the filter cage to detach filtered microparticles from the filtration surface to pass out of the opening at the first end of the filter cage.

2. A filter cage according to claim 1, wherein the user operable portion is configured to be moved by rotating around the axis.

3. A filter cage according to claim 1, wherein the moveable member is removable from the interior of the filter cage.

4. A filter cage according to claim 3, wherein the movable member comprises a secondary filtration surface cleaning portion which is proximal to the filtration surface and is configured to remove filtered microparticles from the filtration surface when the movable member is removed from the filter cage.

5. A filter cage according to claim 1, wherein the moveable member is connected to the user operable portion by being integrally formed, by additional mechanical components or by magnetic connection.

6. A filter cage according to claim 1, wherein the moveable member comprises one or more blades which extend along the length of the filter cage sidewall, optionally wherein the one or more blades are linear and extend parallel to the axis.

7. A filter cage according to claim 6, wherein the filter cage is configured so that the one more blades rotate with the filter cage when the filter cage is rotating, but rotate relative to the filter cage when rotated by the user operable portion; and optionally, wherein the one or more blades are configured to function as an impellor when the filter cage is rotating.

8. A filter cage according to claim 7, wherein the user operable portion is configurable between a first configuration where the user operable portion cannot rotate relative to the filter cage, and a second configuration where the user operable portion can rotate relative to the filter cage.

9. A filter cage according to claim 8, wherein one of the user operable portion and the filter cage comprise one or more latches to engage with one or two or more than two engagement members on the other of the user operable portion and the filter cage.

10. A filter unit according to claim 1, wherein the first end of the filter cage comprises an opening where an edge of the opening is coincident with the filter cage sidewall.

11. A filter cage according to claim 1 wherein filtered microparticles can be removed from the filter cage without opening the second end of the filter cage.

12. A filter unit comprising:

a filter chamber extending along the axis, and comprising opposing first end and second end walls and at least one sidewall extending between the first end and second end walls, wherein both first end and second end walls are coincident with the axis, and wherein the second end wall is or comprises an opening therein and a cap removable from the opening;

a filter cage according to claim 1, contained within the filter chamber and configured to rotate about the axis, wherein the filter cage is removable from the filter chamber through the opening in the second end wall; and wherein the filter chamber further comprises an inlet configured to pass feed liquid into the filter chamber to supply feed liquid into the filter cage via the opening at the first end of the filter cage when the filter is in the filter chamber; and an outlet for passage of filtered liquid out of the filter chamber.

13. A filter unit according to claim 12 wherein the filter unit further comprises:

a connection member comprising a first seal surface and a first connection surface; and a drive shaft configured to drive rotation of the filter cage; wherein the first seal surface is configured to cooperate with a second seal surface to provide a rotary seal permitting relative rotation therebetween and the first connection surface is configured to cooperate with the second connection surface to provide a detachable connection therebetween; wherein the second seal surface is on the filter chamber and the second connection surface is on the filter cage or wherein the second seal surface is on the filter cage and the second connection surface is on the filter chamber.

* * * * *